(12) United States Patent
Muro et al.

(10) Patent No.: US 8,074,104 B2
(45) Date of Patent: Dec. 6, 2011

(54) CONTROLLING APPARATUS AND CONTROLLING METHOD

(75) Inventors: Tomoharu Muro, Kawasaki (JP); Nina Tsukamoto, Kawasaki (JP); Yuji Hanaoka, Kawasaki (JP); Yoko Kawano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/849,354

(22) Filed: Aug. 3, 2010

(65) Prior Publication Data

US 2010/0299565 A1 Nov. 25, 2010

Related U.S. Application Data

(63) Continuation of application No. PCT/JP2008/052145, filed on Feb. 8, 2008.

(51) Int. Cl.
*G06F 11/00* (2006.01)
(52) U.S. Cl. ......................................................... 714/6.1
(58) Field of Classification Search .......... 714/6.1–63.1, 714/22, 14, 24
See application file for complete search history.

(56) References Cited

U.S. PATENT DOCUMENTS

| | | | | |
|---|---|---|---|---|
| 5,586,291 A | * | 12/1996 | Lasker et al. | 711/113 |
| 6,243,795 B1 | * | 6/2001 | Yang et al. | 711/159 |
| 6,523,132 B1 | * | 2/2003 | Harari et al. | 714/6.13 |
| 2003/0014582 A1 | | 1/2003 | Nakanishi | |
| 2004/0205290 A1 | | 10/2004 | Shinagawa et al. | |
| 2006/0224841 A1 | * | 10/2006 | Terai et al. | 711/154 |
| 2007/0186033 A1 | | 8/2007 | Shinagawa et al. | |
| 2011/0010499 A1 | * | 1/2011 | Tsukamoto et al. | 711/118 |

FOREIGN PATENT DOCUMENTS

| | | | |
|---|---|---|---|
| GB | 2256735 A | * | 12/1992 |
| JP | 4-245072 | | 9/1992 |
| JP | 5-346889 | | 12/1993 |
| JP | 6-309234 | | 11/1994 |
| JP | 9-305491 | | 11/1997 |
| JP | 2000-122909 | | 4/2000 |
| JP | 2004-21811 | | 1/2004 |
| JP | 2004-102539 | | 4/2004 |
| JP | 2004-310650 | | 11/2004 |
| JP | 2004-318465 | | 11/2004 |
| JP | 2006-277395 | | 10/2006 |
| WO | WO 02/054247 | | 7/2002 |

OTHER PUBLICATIONS

International Search Report mailed May 13, 2008 for International Application No. PCT/JP2008/052145.

* cited by examiner

*Primary Examiner* — Bryce Bonzo
(74) *Attorney, Agent, or Firm* — Staas & Halsey LLP

(57) ABSTRACT

A controlling apparatus for controlling a disk array unit includes a cache memory for caching data of the disk array unit; a nonvolatile memory for storing the data in the cache memory; and a control unit for detecting a defective location in the nonvolatile memory where the data is stored defectively and updating information indicating the defection location, for generating an error detection code of the updated information, for writing the generated information and the associated error detection code into an area of the nonvolatile memory different from any area where any information indicating any defective location previously detected and stored into the nonvolatile memory, and for controlling writing the data in the cache memory into a location of the nonvolatile memory designated by any selected one of the information stored in the nonvolatile memory.

15 Claims, 17 Drawing Sheets

| | Dirty | Invalid | CRC |
|---|---|---|---|
| 901 | 0 | 0 | |
| | 0 | 0 | |
| | 0 | 1 | |
| | 0 | 0 | |
| | 0 | 1 | |
| | 0 | 1 | |
| | 0 | 1 | |
| | 1 | 0 | |
| | 0 | 0 | |
| | 0 | 0 | |
| | 0 | 0 | |
| | 1 | 0 | |
| | 0 | 0 | |
| | ... | ... | |
| | 0 | 0 | |

(901 = Dirty column, 902 = Invalid column, 903 = CRC)

CONTROLLING APPARATUS AND CONTROLLING METHOD

CROSS-REFERENCE TO RELATED APPLICATION

This is a continuation of application PCT/W/2008/52145, filed on Feb. 8, 2008, the entire contents of which are incorporated herein by reference.

FIELD

The embodiment discussed herein is relates to a controlling apparatus and method for controlling a disk array apparatus and a control method for controlling a disk array apparatus.

BACKGROUND

RAID has a backup unit (battery) for preparing for a case in which electric powers supply cannot be carried out from an outside of a system such as power failure. In a case where the power failure is generated, in order to protect data held by a volatile memory mounted to a controller module, the RAID carries out the electric power supply from the backup unit to the volatile memory. Until the RAID recovers from the power failure, the backup unit keeps supplying the electric power to the volatile memory. Thus, the volatile memory keeps holding the data.

However, a limit exists on a power supply capacity of the backup unit. For that reason, a data guarantee of the volatile memory depends on an electric capacity of the backup unit. If the capacity of the backup unit is increased, a reliability of the data guarantee can be accordingly increased. However, if the number of the backup units is increased in the RAID, new problems occur such as an increase in costs and an increase in size of a RAID apparatus. Also, after the recovery from the power failure, until the backup unit is recharged, a guarantee for a backup cannot be made, and therefore a RAID system is in a write through state (for reporting a completion when the write into a disk is done). As a result, a problem also occurs in which a processing ability of the RAID system is considerably decreased.

Therefore, for the controller module, a backup method of saving the date held by the volatile memory into a nonvolatile memory is conceived, and a problem is how the data is certainly saved into the nonvolatile memory.

The following documents exist with regard to a backup control in the RAID system.

[Patent Document] Japanese Laid-open Patent Publication No. 05-346889, Japanese Laid-open Patent Publication No. 2006-277395, Japanese Laid-open Patent Publication No. 2004-318465, and Japanese Laid-open Patent Publication No. 09-305491.

SUMMARY

According to an aspect of the embodiment, A controlling apparatus for controlling a disk array unit includes a cache memory for caching data of the disk array unit; a nonvolatile memory for storing the data in the cache memory; and a control unit for detecting a defective location in the nonvolatile memory where the data is stored defectively and generating information indicating the defection location, for generating an error detection code of the generated information, for writing the generated information and the associated error detection code into an area of the nonvolatile memory different from any area where any information indicating any defective location previously detected and stored into the nonvolatile memory, and for controlling writing the data in the cache memory into a location of the nonvolatile memory designated by any selected one of the information stored in the nonvolatile memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 9 shows an example of an invalidity management table 218 according to the embodiment.

DESCRIPTION OF EMBODIMENT

[1. Disk Array Apparatus 100]

Figure 1:
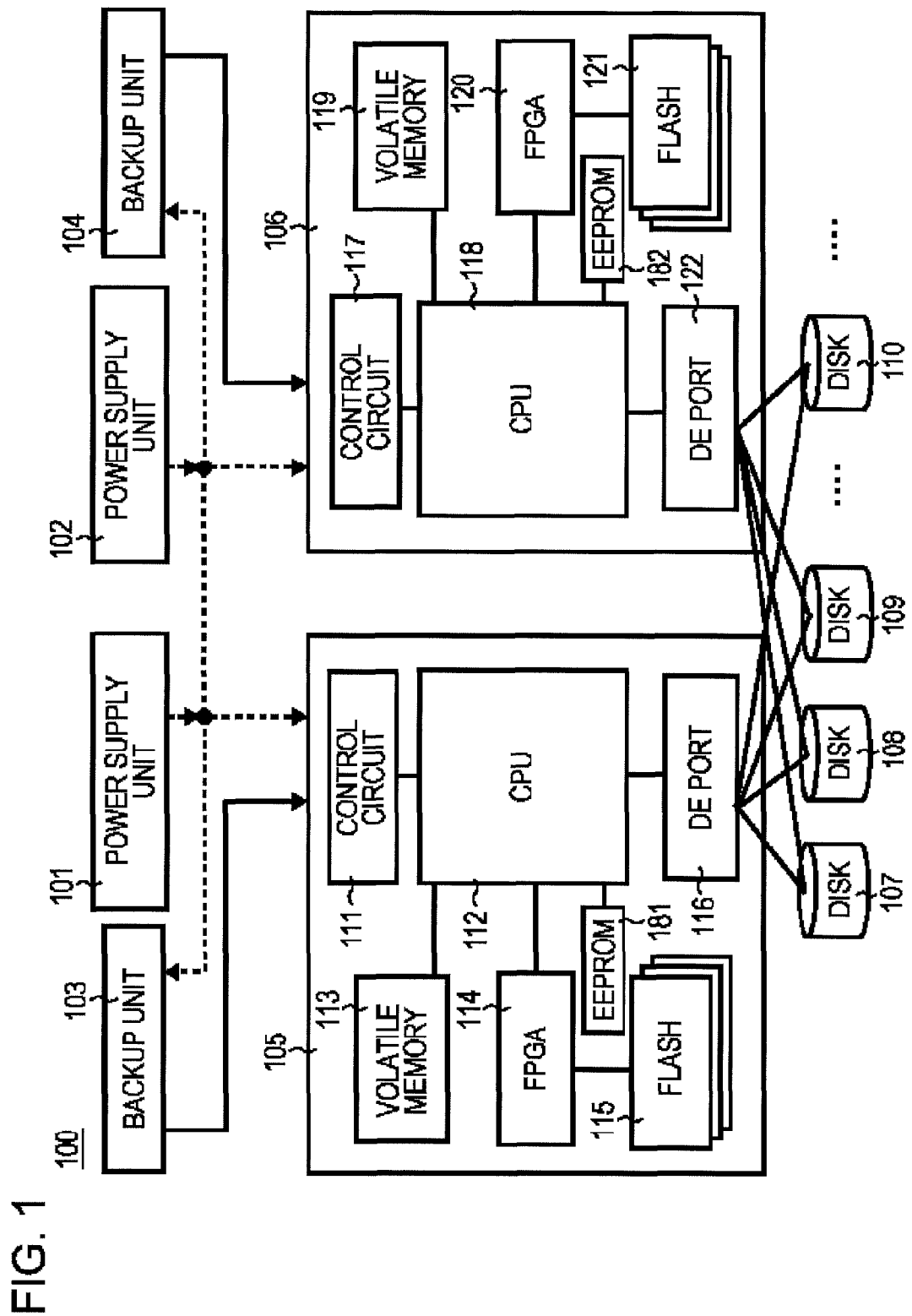
FIG. 1 is a block diagram of a disk array apparatus 100 according to the embodiment.

FIG. 1 is a block diagram of a disk array apparatus 100 according to the embodiment.

The disk array apparatus 100 is composed of power supply units 101 and 102, backup units 103 and 104, CMs (controller modules) 105 and 106, and disks 107, 108, 109, and 110.

The CMs 105 and 106 access the disks 107 to 110 in response to a write/read command from a host computer (not shown) and execute write/read of data.

[1.1. Power Supply Units 101 and 102]

An external source supplies electric power via the power supply units 101 and 102 to the disk array apparatus 100. The disk array apparatus 100 has two AC/DC power supply units: the power supply units 101 and 102. This is because the electric power is supplied to the disk array apparatus 100 from the external source even when one of the power supply units breaks down. That is, the disk array apparatus 100 can cope with a failure of the power supply unit by adopting a redundant configuration of the power supply units 101 and 102. Also, the power supply units 101 and 102 generate a standby power supply and a system power supply. The standby power supply is a power supply of 5V (volt) for supplying the minimum electric power to activate the disk array apparatus 100. The system power supply is a power supply of 12V (volt) for supplying the electric power to operate the disk array apparatus 100. In a case where the disk array apparatus 100 is not in a normal operation, in order to reduce the electric power, the power supply units 101 and 102 output only the standby power supply, and the disk array apparatus 100 is in a standby state. In a case where the disk array apparatus 100 is in the normal operation, the power supply units 101 and 102 output the standby power supply and the system power supply. Then, the power supply units 101 and 102 supply the backup units 103 and 104 with the electric power from the external source for charging.

[1.1.1. Upon Generation of Power Failure]

When power failure is generated and no electric power supply is carried out from the external source to the disk array apparatus 100, the power supply unit 101 notifies the CM 105 that the system power supply is cut off. Similarly, the power supply unit 102 notifies the CM 106 that the system power supply is cut off.

Control circuits 111 and 117 respectively mounted to the CMs 105 and 106 determine that no supply is carried out from the external source to the power supply units 101 and 102. Then, the control circuits 111 and 117 notify CPUs 112 and 118 of a power failure state, and also the control circuits 111 and 117 instruct the backup units 103 and 104 to carry out the electric power supply. A backup unit 103 supplies electric power to the CM 105, and a backup unit 104 supplies electric power to the CM 106.

The CM 105 saves data held by a volatile memory 113 at the time of the power failure in a nonvolatile memory 115 by using the electric power supplied from the backup unit 103. In a similar manner, the CM 106 saves data held by a volatile memory 119 at the time of the power failure in a nonvolatile memory 121 by using the electric power supplied from the backup unit 104.

[1.2. Backup Units 103 and 104]

Also, the disk array apparatus 100 adopts the redundant configuration also for the backup units 103 and 104. The backup unit 103 according to the embodiment supplies the electric power to the CM 105. The backup unit 103 does not supply the electric power to the CM 106. Also, the backup unit 104 according to the embodiment supplies the electric power to the CM 106. The backup unit 104 does not supply the electric power to the CM 105. In the disk array apparatus 100 according to the embodiment, the backup unit 103 supplies the electric power to the CM 105, and the backup unit 104 supplies the electric power to the CM 106. This means that the electric amount supplied to the CMs 105 and 106 by each of the backup units 103 and 104 is large. That is, if a configuration is adopted in which both the backup units 103 and 104 supply the electric power to the CMs 105 and 106, the following problem occurs. When the backup unit of one of the backup units 103 and 104 breaks down and the electric power supply to the CMs 105 and 106 cannot be carried out, only the remaining one backup unit cannot sufficiently supply the electric power to both the CMs 105 and 106 at once. As a result, the data held by the volatile memories 113 and 119 cannot be saved in the nonvolatile memories 115 and 121 as both the CMs 105 and 106 have electric power shortage. For that reason, according to the embodiment, in order that the electric power can be certainly supplied to the CM to which the remaining backup unit corresponds even when one of the backup units 103 and 104 breaks down, the backup units 103 and 104 are connected to the CMs 105 and 106 by a correspondence relation of 1 on 1.

The backup units 103 and 104 are capacitors and can discharge a large amount of electric power at once. Also, the backup units 103 and 104 are capacitors, and the backup units 103 and 104 can perform the recharge in a short period of time. To be specific, the disk array apparatus 100 can perform the charging within two minutes from a state of the 0% charge amount of the backup units 103 and 104 to a fully charged state. In a case where the disk array apparatus 100 according to the embodiment recharges the backup units 103 and 104, after the backup unit 103 is charged, the backup unit 104 is charged. That is, the disk array apparatus 100 performs a control so that a time during which the backup unit 103 is charged is not overlapped with a time for charging 104. This is because, the disk array apparatus 100 quickly charges the backup units 103 and 104 which are the capacitors, and if the times for the disk array apparatus 100 to charge each of the backup units 103 and 104 are overlapped with each other, the current supplied by each of the power supply units 101 and 102 to each of the backup units 103 and 104 may exceed an allowed amount. Of course, the charging order for the disk array apparatus 100 may start from the backup unit 103 or the backup unit 104.

Also, in a case where the disk array apparatus 100 charges the same electric capacity with a lead battery, a nickel hydride battery, or a lithium-ion battery, it takes several hours from the state in which the charge amount of the lead battery is 0% to the fully charged state. Therefore, by applying the capacitor which takes a shorter time for the recharge as compared with the above-mentioned secondary battery to the backup units 103 and 104, it is possible to largely reduce the period of time during which the disk array apparatus 100 executes in the write through state.

[2. CMs 105 and 106]

The CM 105 according to the embodiment is composed of the control circuit 111, a CPU (central processing unit) 112, a volatile memory 113, an FPGA (Field Programmable Gate Array) 114, a nonvolatile memory 115, a DE port 116, and an EEPROM 181. DE is an abbreviation of drive enclosure. In a similar manner, the CM 105 is composed of the control circuit 117, the CPU 118, the volatile memory 119, an FPGA 120, the nonvolatile memory 121, and a DE port 122. The volatile memories 113 and 119 are cache memories, and the nonvolatile memories 115 and 121 are NAND type flash memories.

The volatile memories 113 and 119 are not limited to the cache memories and may be any memory that loses the storage content when the electric power supply is cut off. Similarly, the nonvolatile memories 115 and 121 are not also limited to the flash memories and may be any memory that does not lose the storage content even when the electric power supply is cut off.

[2.1. Control Circuits 111 and 117]

At the time of the normal operation, the external source supplies the electric power to the control circuits 111 and 117 respectively via the power supply units 101 and 102. The power supply units 101 and 102 generate the standby power supply and the system power supply. Also, at the time of power failure, the external source cannot supply electric power to the power supply units 101 and 102. For that reason, the backup units 103 and 104 respectively supply electric power to the control circuits 111 and 119. The mounted units constructing the CMs 105 and 106 (the control circuits 111 and 117, the CPUs 112 and 118, the volatile memories 113 and 119, the FPGA 114, 120, the nonvolatile memories 115 and 121, and the DE ports 116 and 122) are connected to a power supply line, the electric power supply is carried out by the power supply line.

When power failure is generated and no electric power supply is carried out from the external source to the disk array apparatus, the standby power supply and the system power supply generated by the power supply units 101 and 102 are lost. According to this, when a certain period of time elapses, a voltage of the power supply line decreases to be lower than 12 V. Along with that, voltages of the CMs 105 and 106 also decrease.

The power supply units 101 and 102 notify the CMs 105 and 106 that the electric power supply of the system power supply is cut off. In a case where the voltage in the CM 105 is equal to or smaller than 11 V, along with the voltage decrease of the power supply units 101 and 102 which notify the CPU 112 of the power failure state, the control circuit 111 receives the electric power supply from the backup units 103 and 104. Similarly, in a case where the voltage in the CM 106 is equal to or smaller than 11 V, along with the voltage decrease of the power supply units 101 and 102 which notify the CPU 118 of the power failure state, the control circuit 117 receives the electric power supply from the backup units 103 and 104. The CPU 112 sets the power failure flag stored in the EEPROM 181 connected to the CPU 112 as ON (sets the power failure flag as "1"). A state in which the power failure flag is ON means that the disk array apparatus 100 is in the power failure state. As the EEPROM 181 is connected to the CPU 112, the CPU 112 can access the EEPROM 181 at a high speed. Timing for starting the electric power supply from the backup units 103 and 104 is when the voltages in the CMs 105 and 106 are equal to or smaller than a certain threshold. This voltage value (threshold) can be changed in accordance with the electric power amount by the disk array apparatus 100.

[2.2. CPUs 112 and 118]

The CPU 112 is a unit for controlling a processing executed by the CM 105. Similarly, the CPU 118 is also a unit for controlling a processing executed by the CM 105. Via the DE port 116 the CPU 112 performs a control for writing the data on which the write command is issued from the host computer in the disks 107 to 110. A destination for the CPU 112 to write the data may be all of the disks 107 to 110 or a part of the disks 107 to 110 in accordance with the write command from the host computer. Also, via the DE port 116, the CPU 112 performs a control for reading the data on which the read command is issued from the host computer from the disks 107 to 110. In a similar manner, via the DE port 122, the CPU 118 performs a control for writing the data on which the write command is issued from the host computer in the disks 107 to 110. A destination for the CPU 118 to write the data may be all of the disks 107 to 110 or a part of the disks 107 to 110 in accordance with the write command from the host computer. Also, via the DE port 122, the CPU 118 performs a control for reading the data on which the read command is issued from the host computer from the disks 107 to 110.

According to the embodiment, the CM 105 and the CM 106 has the redundant configuration. According to the embodiment, the CM 105 and the CM 106 has a master-slave relation. According to the embodiment, for example, the CM 105 is a master, and the CM 106 is a slave. In a case where the CM 105 and the CM 106 normally operate, the CM 105 writes the data in the disks 107 to 110 or reads the data from the disks 107 to 110. Then, the CM 105 is synchronized with the CM 106, and the data processed by the CM 105 is notified to the CM 106 and copied in the volatile memory 119.

In a case where the CM 105 breaks down, the CPU 102 notifies the CPU 118 that the CM 105 breaks down, and the CM 106 performs the processing of writing the data in the disks 107 to 110 or the processing of reading the data from the disks 107 to 110.

Also, when the notification indicating that the disk array apparatus 100 has power failure is received from the control circuit 111, the CPU 112 controls a saving processing for the data held in the volatile memory 113. The CPU 112 instructs a communication unit 201 of the FPGA 114 to save the data in the volatile memory 113 into the nonvolatile memory 115. Similarly, when the notification indicating that the disk array apparatus 100 has power failure is received from the control circuit 117, the CPU 118 controls a saving processing for the data held in the volatile memory 119. The CPU 118 instructs the communication unit 201 of the FPGA 120 to save the data in the volatile memory 119 into the nonvolatile memory 121. The CPU 112 controls the FPGA 114 to save the data in the volatile memory 113 into the nonvolatile memory 115. In a similar manner, the CPU 118 controls the FPGA 120 to save the data in the volatile memory 119 into the nonvolatile memory.

[2.3. Volatile Memories 113 and 119]

The volatile memory 113 temporarily holds the data on which the write command is issued from the host computer or the data on which the read command is issued from the host computer. The CM 105 issues a completion response to the host computer in a state where the data is written in the volatile memory 113. By possessing the volatile memory 113, the CM 105 can perform a so-called write back operation for writing the data on the volatile memory 113 in the disks 107 to 110 in an asynchronous manner with the operation of the host computer, and it is possible to perform the data processing at a high speed.

In a similar manner, the CM 106 also issues a completion response to the host computer in a state where the data is written in the volatile memory 119. By possessing the volatile memory 119, the CM 106 can perform the write back operation, and it is possible to perform the data processing at a high speed.

[2.4. FPGAs 114 and 120]

Figure 2:
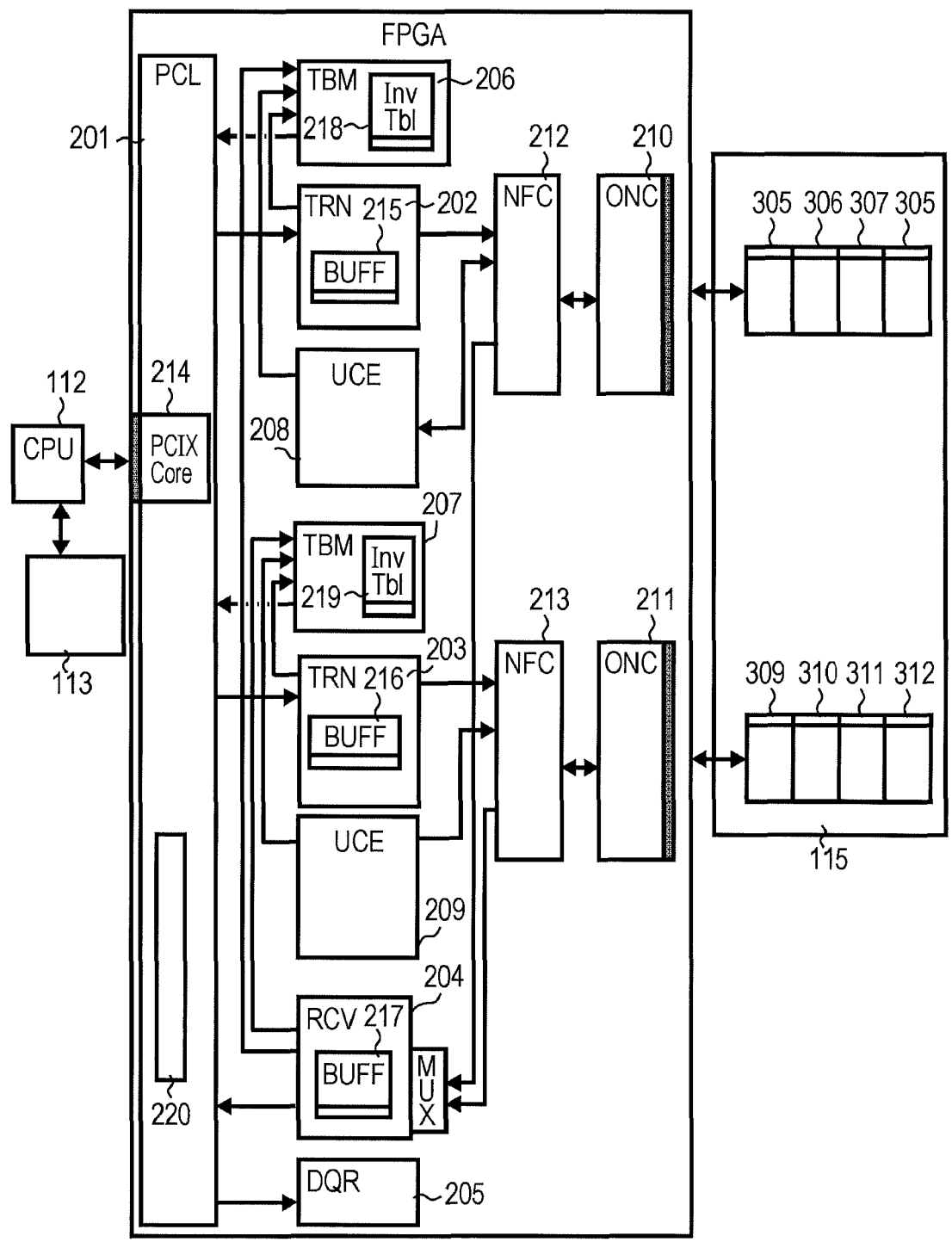
FIG. 2 is a hardware block diagram of an FPGA 114 according to the embodiment.

FIG. 2 is a hardware block diagram of the FPGA 114 according to the embodiment.

The FPGA 114 is composed of a communication unit (PCL) 201, data transfer units (TRN) 202 and 203, a data recovery unit (RCV) 204, a communication management unit (DQR) 205, table management units (TBM) 206, 207, transfer control units (UCE) 208 and 209, memory control units (ONC) 210 and 211, and data conversion control units (NFC) 212 and 213. The FPGA 120 has also a similar configuration. Hereinafter, a description will be given of a hardware configuration of the FPGA 114.

[2.4.1. Communication Unit (PCL) 201]

The communication unit 201 performs a control on a PCI-X interface 214. Then, the communication unit 201 performs a control on a data transfer between the CPU 112 and the FPGA 114. The FPGA 114 uses the PCI-X interface 214 to perform the data transfer with the CPU 112. The communication unit 201 detects an error generated in the data transfer between the CPU 112 and the FPGA 114. Also, the communication unit 201 receives an instruction for saving the data in the volatile memory 113 into the nonvolatile memory 115 from the CPU 112.

Also, the communication unit 201 has a register 220. The register 220 stores data processed by the FPGA 114, setting items for the processing executed by the FPGA 114, communication information managed by the communication management unit 205, and the like. The FPGA 114 uses these pieces of data (the data processed by the FPGA 114, the setting items for the processing executed by the FPGA 114, and the like) to control the data transfer between the CPU 112 and the nonvolatile memory 115.

[2.4.2. Data Transfer Units (TRN) 202 and 203]

In a case where the electric power supply to the CM 105 is switched from the external source to the backup unit 103, the data transfer units 202 and 203 perform the transfer control on the data held in the volatile memory 113 to the nonvolatile memory 115. The data transfer units 202 and 203 receive a data saving instruction via the communication unit 201 from the CPU 112, and the data transfer units 202 and 203 execute a transfer control for the data.

The data transfer unit 202 has a buffer 215. Similarly, the data transfer unit 203 has a buffer 216. The data transfer unit 202 transfers the data held by the volatile memory 113 via the buffer 215 to the data conversion unit 212. Similarly, the data transfer unit 203 transfers the data held by the volatile memory 113 via the buffer 216 to the data conversion unit 213.

Also, the data transfer unit 202 generates parity data and CRC data. Similarly, the data transfer unit 203 also generates the parity data and the CRC data. The parity data is data obtained by calculating an exclusive OR (EXOR) of seven pieces of Page data which is a predetermined unit (Page) for storing the data in the nonvolatile memory 115. The "Page" referred in the embodiment is a data unit for managing the data on the nonvolatile memory 115. Then, the Page data is data with a size of the Page unit. To be more specific, the data is data stored in "Page" shown in FIG. 4. According to the embodiment, the data is 2 k Bytes.

The data transfer unit 202 temporarily holds the data received from the CPU 112 via the PCI-X interface 214 in the buffer 215. Subsequently, the data transfer unit 202 receives the next page data received from the CPU 112 and calculates an exclusive OR of the Page data held in the buffer 215 and the next Page data to calculate an interim result. The data transfer unit 202 holds the calculated interim result in the buffer 215. Furthermore, the data transfer unit 202 receives the Page data from the CPU 112 and calculates an exclusive OR of the Page data and the interim result held in the buffer 215 to calculate a new interim result. The data transfer unit 202 updates new interim result held in the buffer 215. After that, in a similar manner, an exclusive OR of the Page data received by the data transfer unit 202 and the interim result is calculated, and as a result, the parity data which is an exclusive OR of the seven pieces of Page data is calculated. The data transfer unit 203 also calculates the parity data in a similar manner to that for the data transfer unit 202.

Also, the data transfer unit 202 generates the CRC data for checking a consistency of four pieces of main data in the Page data received from the CPU 112. Similarly, the data transfer unit 203 also generates the CRC data for checking a consistency of four pieces of main data in the Page data received from the CPU 112. According to the embodiment, the CRC data has a size of 2 Bytes and is added to the main data to be managed as the Page data. The CRC data is data generated while the data transfer units 202 and 203 compute in the unit of Page data. The CRC data is data indicating whether or not an error is generated in the transfer of the corresponding Page data. That is, the CRC data is the data for checking the consistency of the four pieces of main data in the Page data. As [2.5.3.1. Page 600], by using FIG. 6, a configuration of a Page 600 will be described.

Also, according to the embodiment, the FPGA 114 has the two data transfer units 202 and 203. This is because the saving of the data held in the volatile memory 113 at a higher speed in a short period of time into the nonvolatile memory 115 is to be realized.

Figure 11:
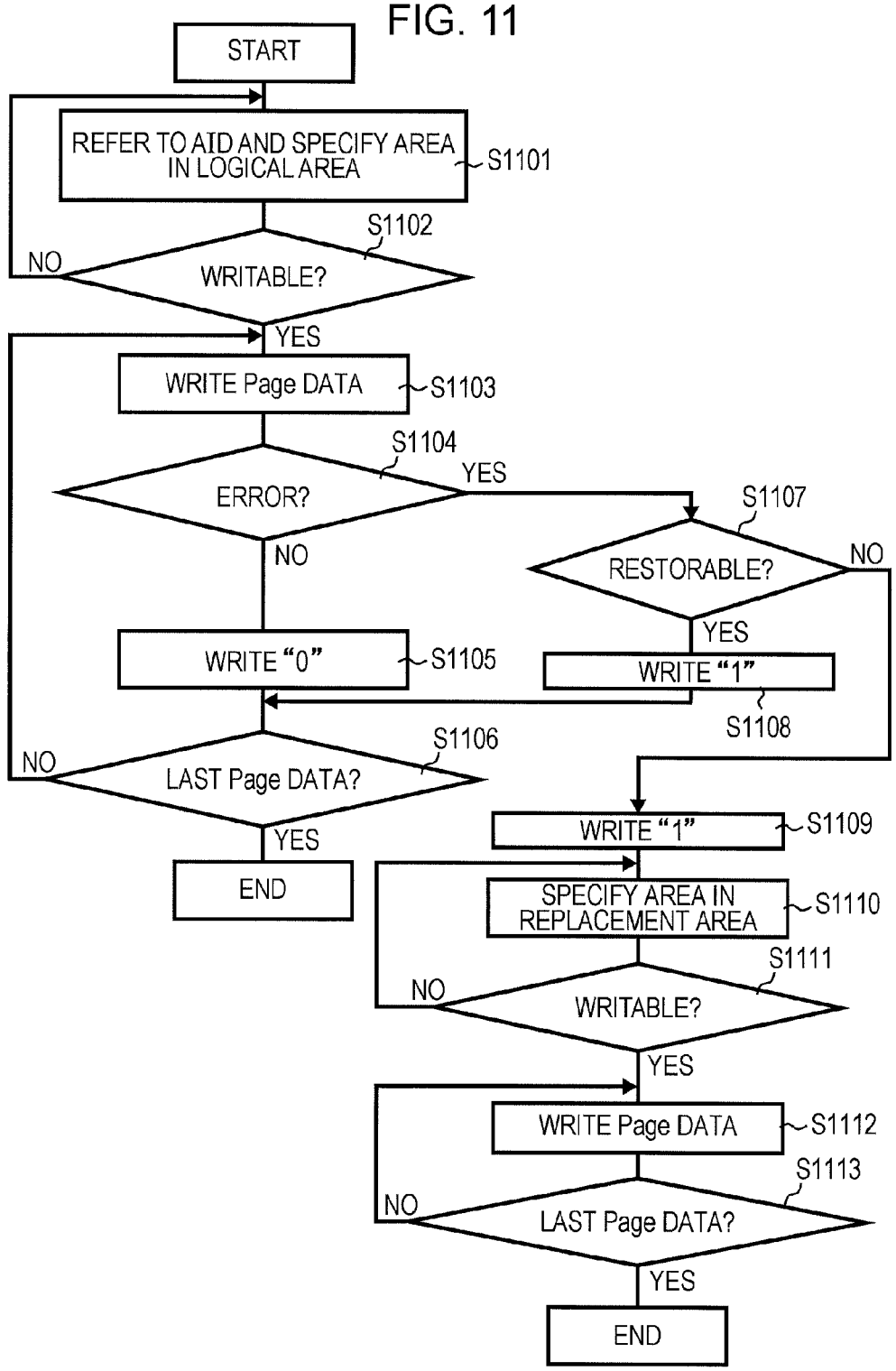
FIG. 11 is a processing flow chart for a data transfer unit 202 according to the embodiment.

FIG. 11 is a processing flow chart of the data transfer unit (TRN) 202 according to the embodiment.

The data transfer unit 202 reads out the transfer length and the address of the volatile memory from setting values stored in the communication management unit 205. Then, the data transfer unit 202 specifies an area in which the data is written from a pointer of an invalidity management table 218 in the table management unit 206 (step S1101). The area specified by the data transfer unit 202 is one of an area 0 to an area 585 in a logical area 1001 shown in FIG. 10.

Then, the data transfer unit 202 refers to the invalidity management table 218 stored in the table management unit 206 to determine whether or not the data can be written in the area specified in step S1101 (step S1102). The invalidity management table 218 is structured by a Dirty flag 901 and an Invalid flag 902. The Dirty flag 901 is a flag for identifying the presence or absence of an "error other than a damage of the device (hardware itself)" in each of 1024 pieces of "Area" in memory chips 301 and 302. "1" of the Dirty flag 901 indicates that the "error other than the damage of the device (hardware itself)" exists, and "0" indicates that the "error other than the damage of the device (hardware itself)" does not exist. The "error other than the damage of the device (hardware itself)" refers to an error representing that even when the FPGA 114 fails the write of the data (error), if the write is retried, a success may be attained.

The Invalid flag 902 is a flag is a flag for identifying the presence or absence of an "error attributed to a damage of the device (hardware itself)" in each of the 1024 pieces of "Area" in the memory chips 301 and 302. "1" of the Invalid flag 902 indicates that the "error attributed to the damage of the device (hardware itself)" exists, and "0" indicates that the "error attributed to the damage of the device (hardware itself)" does not exist. The "error attributed to the damage of the device (hardware itself)" refers to an error representing that even when the FPGA 114 retries the write of the data, there is no possibility of success. In a case where one of the Dirty flag 901 and the Invalid flag 902 corresponding to the specified area is "1", the data transfer unit 202 determines that the data cannot be written in the specified area. In a case where both the Dirty flag 901 and the Invalid flag 902 corresponding to the specified area are "0", the data transfer unit 202 determines that the data can be written in the specified area.

In a case where the data transfer unit 202 determines that the data cannot be written in the specified area (step S1102 NO), the data transfer unit 202 refers to the invalidity management table 218 again to newly specify an area in which the data is written (step S1101). According to the embodiment, a "next area" of the area where it is determined that the write cannot be carried out is specified. The "next area" refers to an "Area" as a result of incrementing the AID indicating the area where it is determined that the write cannot be carried out. According to the embodiment, the area is a "number", and the incrementing means adding "1".

Figure 8:
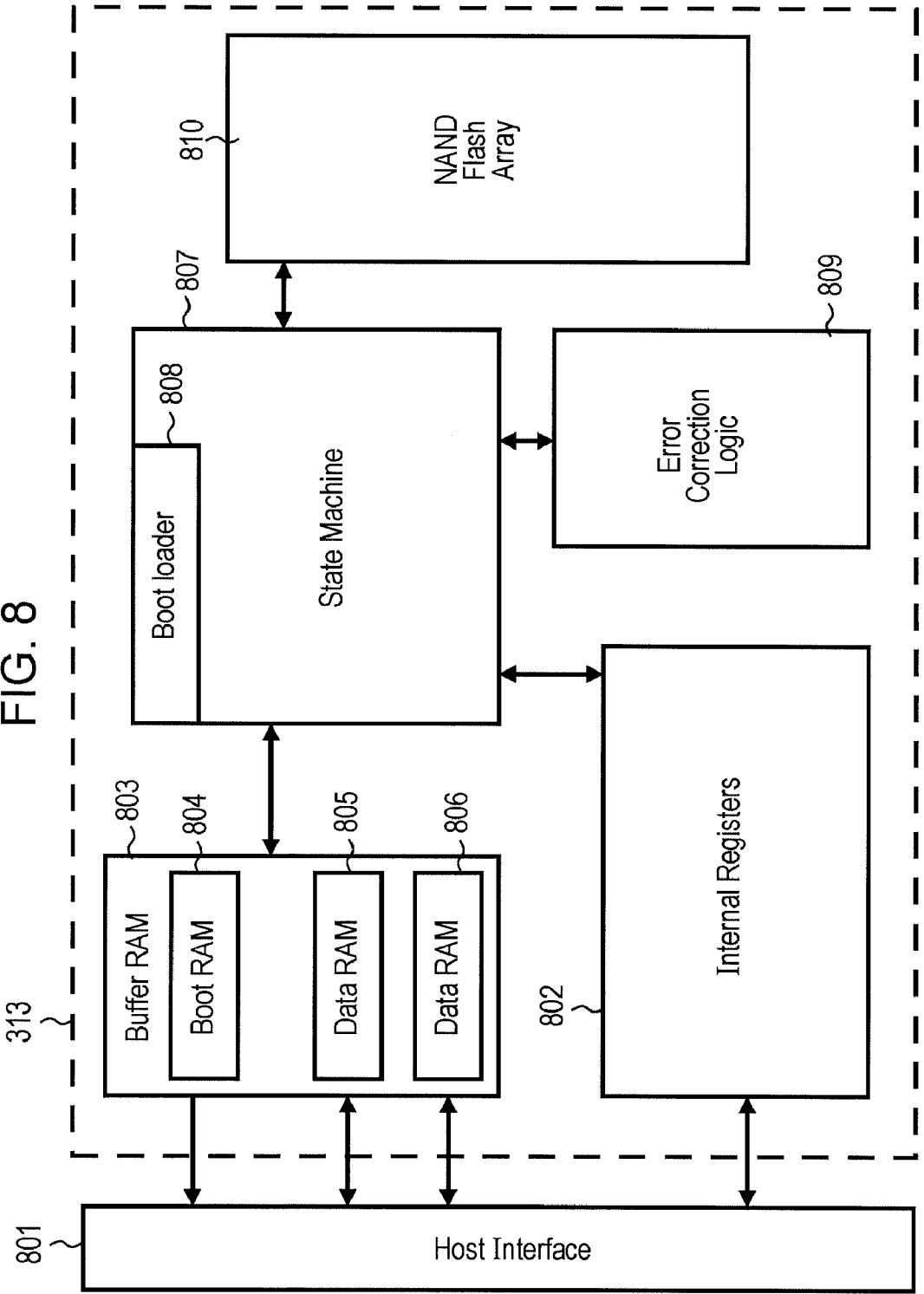
FIG. 8 is a hardware block diagram of a Die 313 according to the embodiment.

In a case where the data transfer unit 202 determines that the data can be written in the specified area (step S1102 YES), the data transfer unit 202 transfers the data via the buffer 215 to the data conversion unit 212 to be written in the nonvolatile memory 115. According to the embodiment, the data transfer unit 202 writes the data in the volatile memory 115 in the "Page" unit. In other words, the data transfer unit 202 writes the Page data in the specified area in the nonvolatile memory 115. To be more specific, state machines constituting Dies 313 to 320 store the Page data transferred by the data transfer unit 202 in a nonvolatile memory array. FIG. 8 is a specific block diagram of the Die 313. The Dies 313 to 320 have two data buffers (data buffers 805 and 806) each, and the state machines constituting of the Dies 313 to 320 stores the Page data transferred by the data transfer unit 202 in the nonvolatile memory array via these data buffers.

Then, the data transfer unit 202 determines whether or not an error is generated in the write of the Page data (step S1104). The data transfer unit 202 determines the presence or absence of the error depending on whether or not an error notification from the state machines of the Dies 313 to 320 is received. Also, the data transfer unit 202 receives the error notification from the communication unit 201 to detect an error between the nonvolatile memory 113 and the FPGA 114.

In a case where the data transfer unit 202 determines "no error" (step S1104 NO), the Dirty flag 901 and the Invalid flag 902 corresponding to the specified area in the invalidity management table 218 are both set as "0" (step S1105). Herein, at a time point when the data transfer unit 202 starts writing the Page data in the specified area, the Dirty flag 901 and the Invalid flag 902 corresponding to the specified area are both "0". For that reason, no change occurs in the Dirty flag 901 and the Invalid flag 902.

The data transfer unit 202 determines whether or not the Page data written in the nonvolatile memory 115 is a last Page data written in the specified area (step S1106). In a case where the data transfer unit 202 determines that the data is not the last Page data (step S1106 NO), the data transfer unit 202 writes the next Page data in the specified area (step 1103). A region ("Page") for the data transfer unit 202 to write the "next Page data" is a region ("Page") associated with a data buffer which is different from the data buffer used for storing the Page data of which write is completed in the specified area immediately before. The data buffer is a data buffer possessed by the Dies 313 to 320. In a case where the data transfer unit 202 determines that the data is the last Page data (step S1106 YES), the data transfer unit 202 ends the processing.

In step S1106, in a case where the data transfer unit 202 determines "error exists" (step S1104 YES), it is further determined whether or not the error data can be restored (step S1107). The data transfer unit 202 determines whether or not the error data can be restored depending on whether or not the data can be restored by using the parity data and the CRC data. The data transfer unit 202 makes a determination as to whether or not the data can be restored depending on whether or not error data (other Page data) already exists in the stripe structured by the Page data. Specific configuration examples of a stripe are stripes 501 and 502 shown in FIG. 5. If the data transfer unit 202 can restore the error data (step S1107 YES), the data transfer unit 202 does not need to write back again from the first data where the write is started in response to the instruction from the CPU 112 in another region (replacement area 1002). That is, as the data transfer unit 202 determines whether or not the error can be restored, it need not provide the region of the replacement area for saving the data written into the region including the restorable error, and it is thus possible to reduce the capacity of the replacement area 1002.

In a case where the data transfer unit 202 determines that the error data can be restored (step S1107 YES), the data transfer unit 202 destroys the CRC data and put a mark on the restorable error. Herein, the data transfer unit 202 does not update the invalidity management table 218. The data transfer unit 202 updates the invalidity management table 218 when the data is written back (step S1108). The determination on which one of the Dirty flag 901 and the Invalid flag 902, is set as "1" is as follows. When the error is not attributed to the damage of the hardware itself of the nonvolatile memory 115, the data transfer unit 202 sets the Dirty flag 901 in the specified area as "1". When the error is not attributed to the damage of the hardware itself of the nonvolatile memory 115, the data transfer unit 202 sets the Invalid flag 902 in the specified area as "1". Then, the data transfer unit 202 determines whether or not the Page data is the last Page data (step S1106).

Also, in a case where the data transfer unit 202 determines that the error data cannot be restored (step S1107 NO), the data transfer unit 202 sets one of the Dirty flag 901 and the Invalid flag 902 corresponding to the specified area in the invalidity management table 218 as "1" (step S1109). The determination on which one of the Dirty flag 901 and the Invalid flag 902 is set as "1" is the same standard as described above. Then, the data transfer unit 202 newly specifies an area in the replacement area 1002 (step 1110). The data transfer unit 202 refers to the invalidity management table 218 stored in the table management unit 206 to determine whether or not the data can be written in the area specified in step S1110 (step S1111).

In a case where the data transfer unit 202 determines that the data cannot be written in the specified area (step S1111 NO), the data transfer unit 202 refers to the invalidity management table 218 again to newly specify an area in which the data is written (step S1110).

In a case where the data transfer unit 202 determines that the data can be written in the specified area (step S1111 YES), the data transfer unit 202 transfers the data via the buffer 215 to the data conversion unit 212 to be written in the nonvolatile memory 115 (step S1112). Also, herein, the data transfer unit 202 determines whether or not an error is generated in the write of the Page data, and a processing equivalent to steps 1104 to 1109 is carried out (not shown). To be specific, in a case where the data transfer unit 202 determines "no error", the Dirty flag 901 and the Invalid flag 902 corresponding to the specified area in the invalidity management table 218 are both set as "0". In a case where the data transfer unit 202 determines "error exists", it is further determined whether or not the error data can be restored. In a case where the data transfer unit 202 determines that the error data can be restored, the data transfer unit 202 destroys the CRC data and put a mark on the restorable error. The data transfer unit 202 does not update the invalidity management table 218. The data transfer unit 202 updates the invalidity management table 218 when the data is written back. Also, in a case where the data transfer unit 202 determines that the error data cannot be restored, the data transfer unit 202 sets one of the Dirty flag 901 and the Invalid flag 902 corresponding to the specified area in the invalidity management table 218 as "1". The determination on which one of the Dirty flag 901 and the Invalid flag 902 is set as "1" is the same standard as described above. Then, the data transfer unit 202 specifies an area in the replacement area 1002 again.

The data transfer unit 202 determines whether or not the Page data written in the nonvolatile memory 115 is a last Page data written in the specified area (step S1113). In a case where the data transfer unit 202 determines that the data is not the last Page data (step S1113 NO), the data transfer unit 202 writes the next Page data in the specified area (step 1112). In a case where the data transfer unit 202 determines that the data is the last Page data (step S1113 YES), the data transfer unit 202 ends the processing.

Also, in step S1104, in a case where the data transfer unit 202 determines "error exists" (step S1104 YES), the data transfer unit 202 sets one of the Dirty flag 901 and the Invalid flag 902 as "1" to update the invalidity management table 218. Then, the transfer control unit 208 writes the updated invalidity management table 218 in the nonvolatile memory 115. A step in which the data transfer unit 202 determines "error exists" in step S1104 (step S1104 YES) is a step equivalent to step S1607 described in FIG. 16. [2.4.3. Data recovery unit (RCV) 204]

The data recovery unit 204 performs a control for transferring the data from the nonvolatile memory 115 to the volatile memory 113 at the time of power recovery.

When the disk array apparatus 100 has the power recovery, the CPU 112 instructs the FPGA 114 (to be more specific, the data recovery unit 204 in the FPGA 114) to write back the data saved into the nonvolatile memory 115 to the volatile memory 113. Then, the data recovery unit 204 receives the instruction from the CPU 112, and the data recovery unit 204 executes the data transfer control (data transfer control from the nonvolatile memory 115 to the volatile memory 113).

The data recovery unit 204 has a buffer 217. The data recovery unit 204 transfers the data held by the nonvolatile memory 115 to the communication unit 201 via the buffer 217. Then, the communication unit 201 transfers the data via the CPU 112 to the volatile memory 113.

Also, the data recovery unit 204 detects an error of the Page data received from the nonvolatile memory 115 via the memory control units 210 and 211 and the data conversion control units 212 and 213. The data recovery unit 204 checks the CRC data to check a consistency between the data written by the data transfer units 202 and 203 in the nonvolatile memory 115 with the data read by the data recovery unit 204. In a case where the data recovery unit 204 detects the error in the check on the CRC data, it is determined whether or not a restoration can be made by using the parity data corresponding to the detected error data. In a case where the data recovery unit 204 determines that the error data can be restored by using the parity data, the data recovery unit 204 restores the error data by using the parity data corresponding to the error data.

Herein, the CRC data is data generated by the data transfer units 202 and 203 for each Page data. This is because a state in which the data recovery unit 204 detects the data in the check on the CRC data means that a consistency does not exist between the data read by the data recovery unit 204 from the nonvolatile memory 115 and the data written by the data transfer units 202 and 203 in the nonvolatile memory 115.

[2.4.4. Communication Information Management Unit (DQR) 205]

The communication management unit 205 holds the data transfer units 202 and 203 and communication information used for the processing control of the data recovery unit 204. The data transfer units 202 and 203 and the data recovery unit 204 reads the communication information from the communication management unit 205 and execute the respective processing controls.

The communication information is composed of a command issued for executing a processing, memory addresses in the volatile memory 113 and the nonvolatile memory 115, a data amount transferred at once between the volatile memory 113 and the nonvolatile memory 115 (transfer length), and an AID (Area ID).

The communication information a command issued for executing a processing, memory addresses in the volatile memory 113 and the nonvolatile memory 115, a data amount transferred at once between the volatile memory 113 and the nonvolatile memory 115 (transfer length), and the address of the volatile memory (memory address).

The transfer length (the data amount transferred at once) is information which can be set by using the FPGA 114 while taking into account a relation between the volatile memory 113 and the nonvolatile memory 115.

The data transfer units 202 and 203 and the data recovery unit 204 respectively refer to the invalidity management tables 218 and 219 to perform data write or date read for each region in order. The AID is an ID for identifying an "Area" added for each area. According to this, a "drop of the region accessed by the FPGA 114" can be prevented. The "drop of the region accessed by the FPGA 114" means that the order of the regions accessed by the data transfer units 202 and 203 and the data recovery unit 204 is not an order previously decided. The data transfer units 202 and 203 sets an initial value of the AID, and in accordance with the command issued by the CPU 112, increments the initial value of the AID to generate the AID. The data transfer units 202 and 203 stores the generated AID in a User region of the nonvolatile memory 115. The User region is a region equivalent to a User region 706 constructing a spare-sector 700 shown in FIG. 7.

[2.4.5. Table Management Units (TBM) 206 and 207]

The table management unit 206 performs a control on the invalidity management table 218.

The invalidity management table 218 is a table referred to by the FPGA 114 (the data transfer unit 202 and the data recovery unit 204) to determine whether or not the FPGA 114 can perform the data write to the "Area" and the data read from the "Area".

According to the embodiment, the region where the error managed by the invalidity management table 218 is generated is a region identified by the area. In other words, in the "Area" where the FPGA 114 writes the data in the nonvolatile memory 115 on the basis of a one-time instruction from the CPU 112, in a case where the FPGA 114 (the data transfer unit 202 and the data recovery unit 204) detects an error, the table management unit 206 writes a flag indicating that the error exists in the region in the invalidity management table 218. A configuration of the "Area" will be described in [2.5.2. Configuration 2 of the nonvolatile memory 115].

[2.4.5.1. Invalidity Management Table 218]

FIG. 9 shows an example of the invalidity management table 218 according to the embodiment.

The invalidity management table 218 is structured by the Dirty flag 901 and the Invalid flag 902. The "Area" managed by the table management unit 206 with the invalidity management table 218 is the 1024 pieces of "Area" of the memory chips 301 and 302.

The Dirty flag 901 is the flag for identifying the presence or absence of an "error other than the damage of the device (hardware itself)" in each of the 1024 pieces of "Area" in the memory chips 301 and 302. "1" of the Dirty flag 901 indicates that the "error other than the damage of the device (hardware itself)" exists, and "0" indicates that the "error other than the damage of the device (hardware itself)" does not exist. The "error other than the damage of the device (hardware itself)" refers to an error representing that even when the FPGA 114 fails the write of the data (error), if the write is retried, a success may be attained.

The Invalid flag 902 is a flag is a flag for identifying the presence or absence of an "error attributed to a damage of the device (hardware itself)" in each of the 1024 pieces of "Area" in the memory chips 301 and 302. "1" of the Invalid flag 902 indicates that the "error attributed to the damage of the device (hardware itself)" exists, and "0" indicates that the "error attributed to the damage of the device (hardware itself)" does not exist. The "error attributed to the damage of the device (hardware itself)" refers to an error representing that even when the FPGA 114 retries the write of the data, there is no possibility of success.

Similarly, the table management unit 207 also controls the invalidity management table 219 showing the area where the error in the data read and the data write in the nonvolatile memory 115 is generated. The "Area" managed by the table management unit 207 with the invalidity management table 219 is the 1024 pieces of "Area" in the memory chips 303 and 304. Then, the invalidity management table 219 is also composed of a Dirty flag and an Invalid flag equivalent to the Dirty flag 901 and the Invalid flag 902.

Then, the CRC data 903 is added to the invalidity management table 218 according to the embodiment. The transfer control unit 208 adds the CRC data 903 to the invalidity management table 218. The CRC data 903 is data generated while the transfer control unit 208 computes by using the invalidity management table 218. The CRC data 903 is data indicating whether or not an error is generated in the transfer between the FPGA 114 of the invalidity management table 218 and the nonvolatile memory 115. That is, the CRC data 903 is data indicating whether or not the invalidity management table 218 is damaged in the transfer between the FPGA 114 and the nonvolatile memory 115.

[2.4.6. Transfer Control Units (UCE) 208 and 209]

The transfer control units 208 and 209 perform a command (CMD) issuance control to the nonvolatile memory 115. According to the embodiment, the number of the transfer control units is two that are the transfer control units 208 and 209, and this corresponds to the number of buses for transferring the data to the nonvolatile memory 115.

At the time of power failure, the transfer control unit 208 writes the invalidity management table 218 of the table management unit 206 in the nonvolatile memory 115. At this time, the transfer control unit 208 generates the CRC data 903 corresponding to the invalidity management table 218 on the basis of the invalidity management table 218 and adds the CRC data 903 to the invalidity management table 218. The transfer control unit 208 duplicates the invalidity management table 218 to which the CRC 903 is added to be stored in the nonvolatile memory 115.

Figure 4:
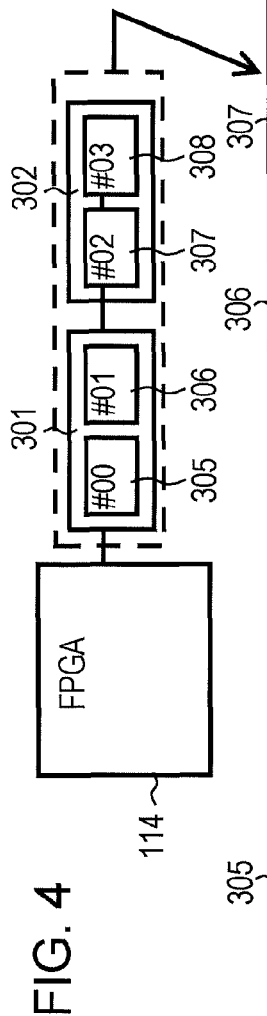
FIG. 4 is a detail view of Banks 305 to 308 of the nonvolatile memory 115 according to the embodiment.

The region where the transfer control unit 208 duplicates and writes the invalidity management table 218 is "Block 0" shown in FIG. 4. According to the embodiment, the region "Block 0" where the transfer control unit 208 writes the invalidity management table 218 is eight pieces of "Block 0" constituting Banks 305 to 308. Among these eight pieces of "Block 0", the transfer control unit 208 duplicates and writes the invalidity management table 218 in two pieces of "Block 0".

Then, the table management unit 206 performs the update of the invalidity management table 218. The FPGA 114 (the data transfer unit 202 and the data recovery unit 204) detects an error, and the table management unit 206 writes a flag indicating that the error exists in the region in the invalidity management table 218 to update the invalidity management table 218.

According to the embodiment, the invalidity management tables 218 in four generations are stored in the eight pieces of "Block 0" of the nonvolatile memory 115. The number of "Block 0" constituting the Banks 305 to 308 is eight, and therefore the transfer control unit 208 leaves the invalidity management table 218 before the update in the "Block 0" of the nonvolatile memory 115. A difference of the generations is a difference before or after the update of the invalidity management table 218. That is, in the eight pieces of "Block 0" of the Banks 305 to 308, the latest invalidity management table 218, the invalidity management tables 218 in the four generations including the invalidity management table 218 immediately before the update, the last invalidity management table 218 immediately before the update but one, and the last invalidity management table 218 immediately before the update but two are respectively duplicated and stored. Then, in a case where the table management unit 206 newly updates the invalidity management table 218, the transfer control unit 208 duplicates and writes the updated invalidity management table 218 in the two pieces of "Block 0" where the invalidity management table 218 whose generation is the oldest is stored.

Generation information for a management in order that which generation of the invalidity management table 218 is stored in which "Block 0" is stored in the EEPROM 181 connected to the CPU 112. As the EEPROM 181 is connected to the CPU 112, the CPU 112 can access the EEPROM 181 at a higher speed as compared with the nonvolatile memory 115. The CPU 112 updates the relevant generation information. That is, as the latest invalidity management table 218 is stored in the "Block 0" in which the oldest invalidity management table 218 is stored, the CPU 112 updates the order of the generations for the invalidity management tables 218 stored in the eight pieces of "Block 0" in the generation information. The transfer control unit 208 refers to the generation information to read the latest invalidity management table 218 from the nonvolatile memory 115.

Similarly, at the time of power failure, the transfer control unit 209 writes the invalidity management table 219 of the table management unit 207 in the nonvolatile memory 115. At this time too, on the basis of the invalidity management table 219, the transfer control unit 209 generates the CRC data corresponding to the invalidity management table 219 and adds the CRC data to the invalidity management table 219.

The region where the transfer control unit 209 duplicates and writes the invalidity management table 219 is "Block 0" of Banks 309 to 312. Among the eight pieces of "Block 0" of the Banks 309 to 312, the transfer control unit 209 duplicates and writes the invalidity management table 219 in two pieces of "Block 0".

In the eight pieces of "Block 0" of the Banks 309 to 312, the invalidity management tables 219 in four generations including the latest invalidity management table 219, the invalidity management table 219 immediately before the update, the last invalidity management table 219 immediately before the update but one, and the last invalidity management table 218 immediately before the update but two are respectively duplicated and stored. Also, generation information for a management in order that which generation of the invalidity management table 219 is stored in which "Block 0" is stored in an EEPROM 182 connected to the CPU 118. The CPU 112 updates the relevant generation information. As the EEPROM 182 is connected to the CPU 118, the CPU 118 can access the EEPROM 182 at a higher speed as compared with the nonvolatile memory 121.

Also, at the time of power recovery, the transfer control unit 208 performs a control for reading the invalidity management table 218 held in the nonvolatile memory 115 into the table management unit 206. Similarly, at the time of power recovery, the transfer control unit 209 performs a control for reading the invalidity management table 219 held in the nonvolatile memory 115 into the table management unit 207.

Figure 12:
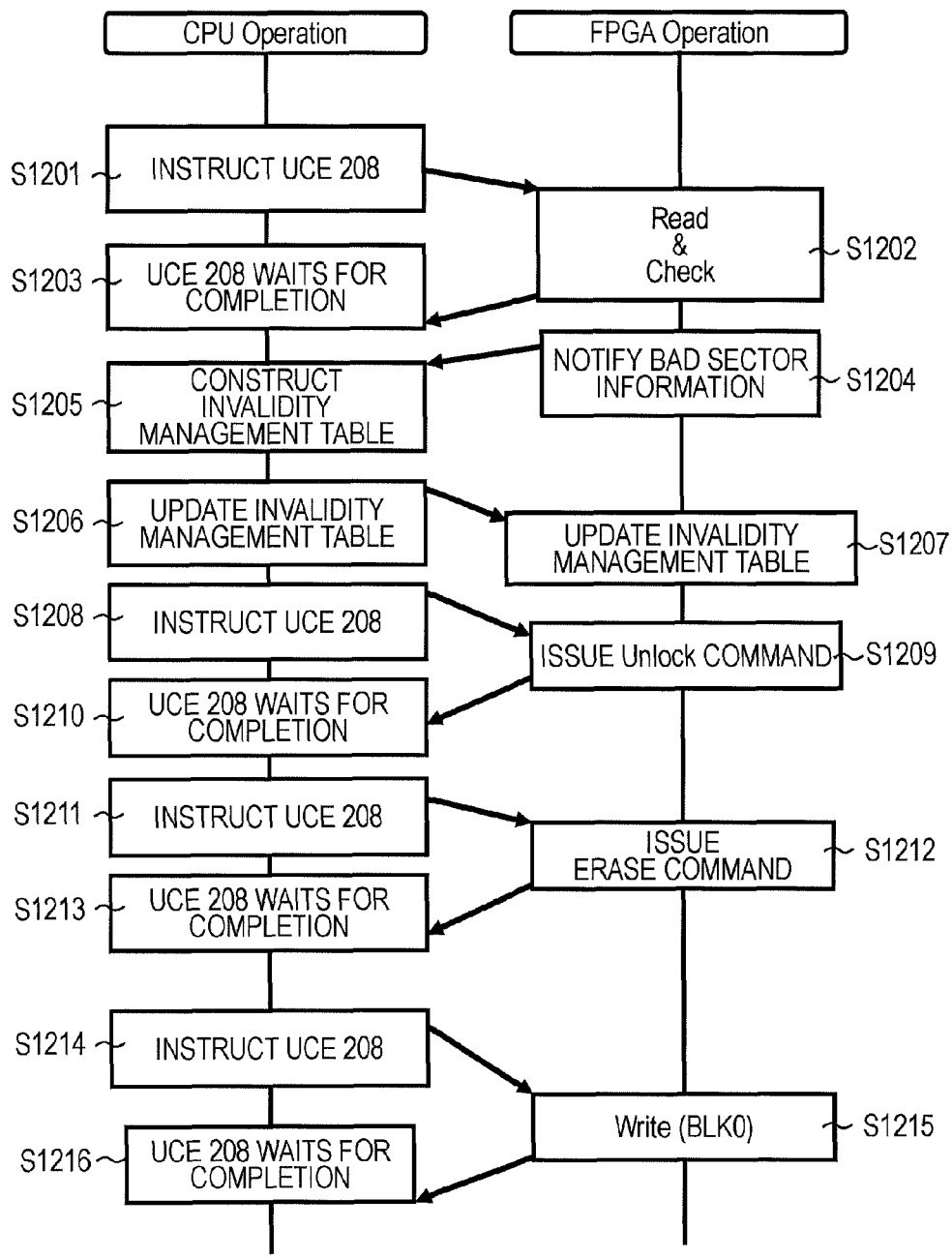
FIG. 12 is a construction sequence diagram of the invalidity management table 218 according to the embodiment.

Also, FIG. 12 is a sequence diagram for the structure of the invalidity management table 218 according to the embodiment. Herein, a sequence of the structure of the invalidity management table 219 is also a similar sequence diagram and omitted.

At the time of factory shipment, the nonvolatile memory 115 has already a bad sector in general. For example, an Invalid region 701 shown in FIG. 7 stores information (bad sector information) as to whether or not a main-sector corresponding to the spare-sector 700 is bad at the time of factory shipment of the nonvolatile memory 115. The transfer control unit 208 constructs the invalidity management table 218 from the bad sector information of the nonvolatile memory 115.

First, when a power supply of the disk array apparatus 100 is turned ON for the first time, the CPU 112 instructs the FPGA 114 (to be more specific, the transfer control unit 208) to activate the transfer control unit 208 (step S1201). The transfer control unit 208 activates and reads the bad sector information from the nonvolatile memory 115 (Read) to check the bad sector of the nonvolatile memory 115 (Check) (step S1202). The CPU 112 waits for a notification of the processing completion from the transfer control unit 208 (step S1203). The transfer control unit 208 notifies the CPU 112 that the read of the bad sector information and the processing for the bad sector check are completed, and the transfer control unit 208 notifies the CPU 112 of the read bad sector information (step 1204).

The CPU 112 constructs the invalidity management table 218 from the bad sector information received from the transfer control unit 208 (step S1205).

The CPU 112 instructs the transfer control unit 208 to update the constructed invalidity management table 218 (step S1206). When the instruction is received from the CPU 112, the transfer control unit 208 updates the invalidity management table 218 (step S1207). To be more specific, the transfer control unit 208 instructs the table management unit 206 to update the invalidity management table 218, and the table management unit 206 writes a flag indicating that an error exists in the region in the invalidity management table 218.

The CPU 112 instructs the transfer control unit 208 to perform a processing of cancelling the write prohibition to the nonvolatile memory 115 (step S1208). At the time of factory shipment, the nonvolatile memory 115 is in a state of the write prohibition (write protect state). The transfer control unit 208 issues an Unlock command to the nonvolatile memory 115 to cancel the write prohibition of the nonvolatile memory 115 (step S1209). The CPU 112 waits for a notification of the processing completion from the transfer control unit 208 (step 1210).

The CPU 112 instructs the transfer control unit 208 to perform an erase processing on the nonvolatile memory 115 (step S1211). The erase processing referred herein is a processing of initializing the "Block 0" and putting the "Block 0" storing the invalidity management table 218 in a state of data non-storage. The transfer control unit 208 issues an erase command to perform the erase processing (step S1212). The CPU 112 waits for a notification of the erase processing completion from the transfer control unit 208 (step S1213).

Then, the CPU 112 instructs the transfer control unit 208 to write the invalidity management table 218 in the "Block 0" of the nonvolatile memory 115 (step S1214). The transfer control unit 208 stores the invalidity management table 218 in the eight pieces of "Block 0" of the Banks 305 to 308 (write) (step S1215). With this, at the time of factory shipment, the invalidity management tables 218 are stored in an identical generation (same generation) in all of the eight pieces of "Block 0" of the Banks 305 to 308 which can store the invalidity management tables 218 in the four generations.

Figure 13:
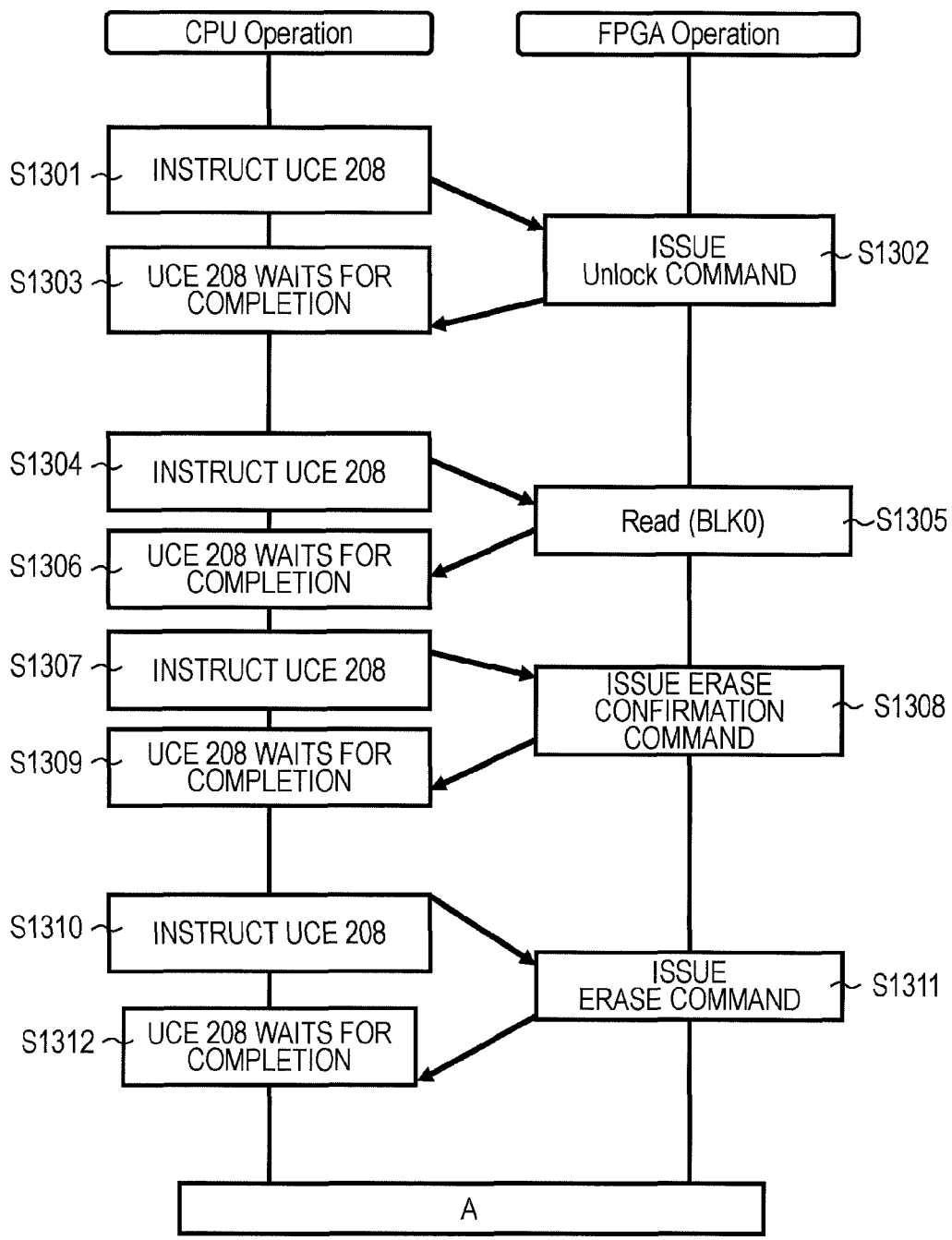
FIG. 13 is a drawing related to a processing sequence of the invalidity management table 218 according to the embodiment.
Figure 14:
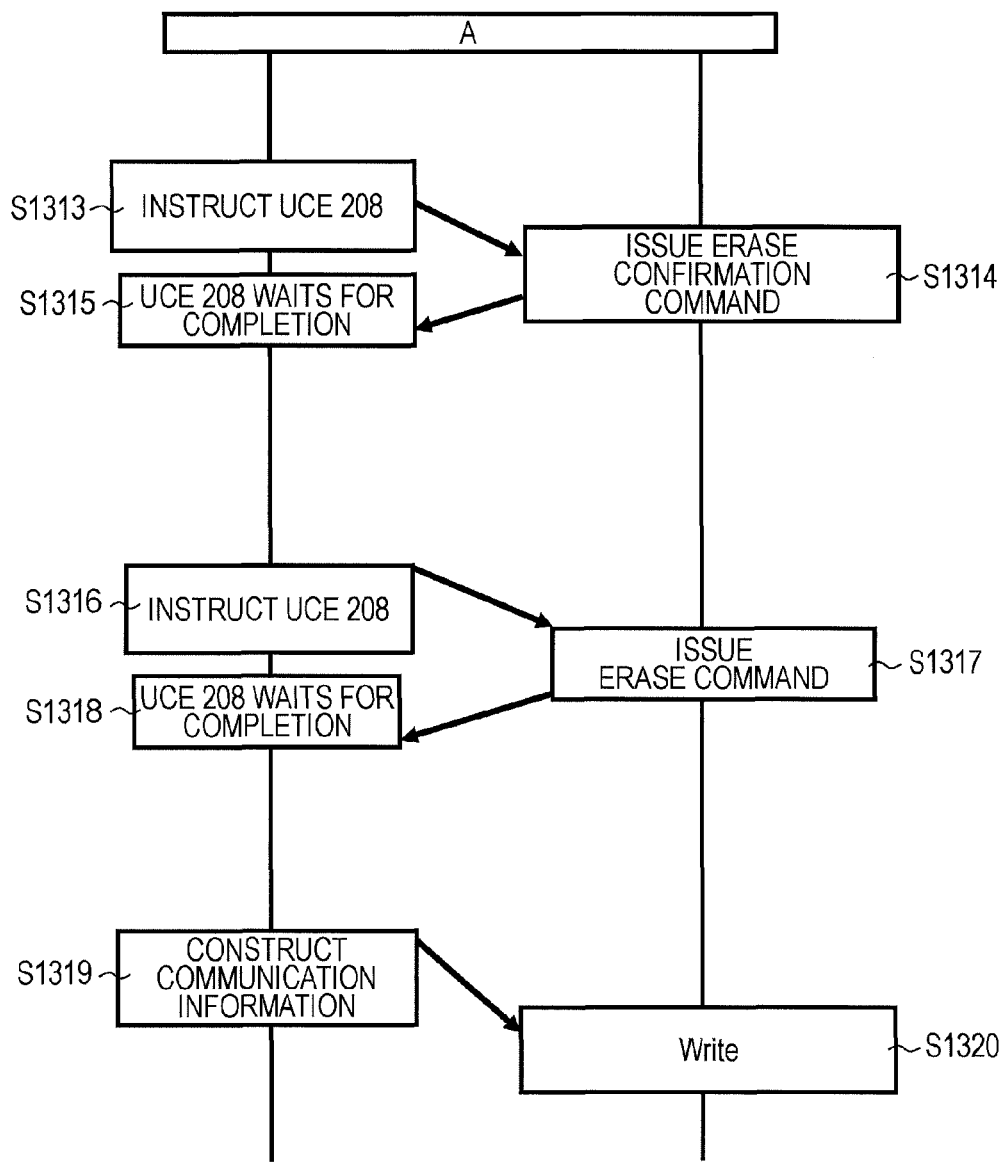
FIG. 14 is a drawing related to a processing sequence of the invalidity management table 218 according to the embodiment.

FIG. 13 and FIG. 14 are drawings related to a processing sequence of the invalidity management table 218 according to the embodiment.

In FIG. 12, the transfer control unit 208 stores the invalidity management table 218 in the eight pieces of "Block 0" of the Banks 305 to 308. FIG. 13 and FIG. 14 are sequence diagrams thereafter executed by the CPU 112 and the FPGA 114 when the power supply of the disk array apparatus 100 is turned OFF, and the power supply is turned ON later again.

In a case where the power supply of the disk array apparatus 100 is turned OFF, the FPGA 114 does not hold the invalidity management table 218. In this case, the invalidity management table 218 is stored only in the nonvolatile memory 115. When the power supply of the disk array apparatus 100 is switched from OFF to ON, the FPGA 114 reads the invalidity management table 218 from the nonvolatile memory 208 to be expanded onto the FPGA 114. To be more specific, the transfer control unit 208 reads the invalidity management table 208 from the "Block 0" of the nonvolatile memory 115 to be expanded onto the table management unit 206. This is because at the time of power failure, the CPU 112 and the FPGA 114 save the data held in the volatile memory 113 into the nonvolatile memory 115. That is, this is because the FPGA 114 manages the bad sector of the nonvolatile memory 115, and the data held in the volatile memory 113 is certainly saved into the nonvolatile memory 115 at the time of power failure.

First, when the power supply of the disk array apparatus 100 is turned ON, the CPU 112 instructs the FPGA 114 to activate the transfer control unit 208 (step S1301). The transfer control unit 208 issues the Unlock command to the nonvolatile memory 115 to cancel the write prohibition into the nonvolatile memory 115 (step S1302). The CPU 112 waits for a completion notification of the write prohibition cancellation from the transfer control unit 208 (step S1303).

Figure 15:
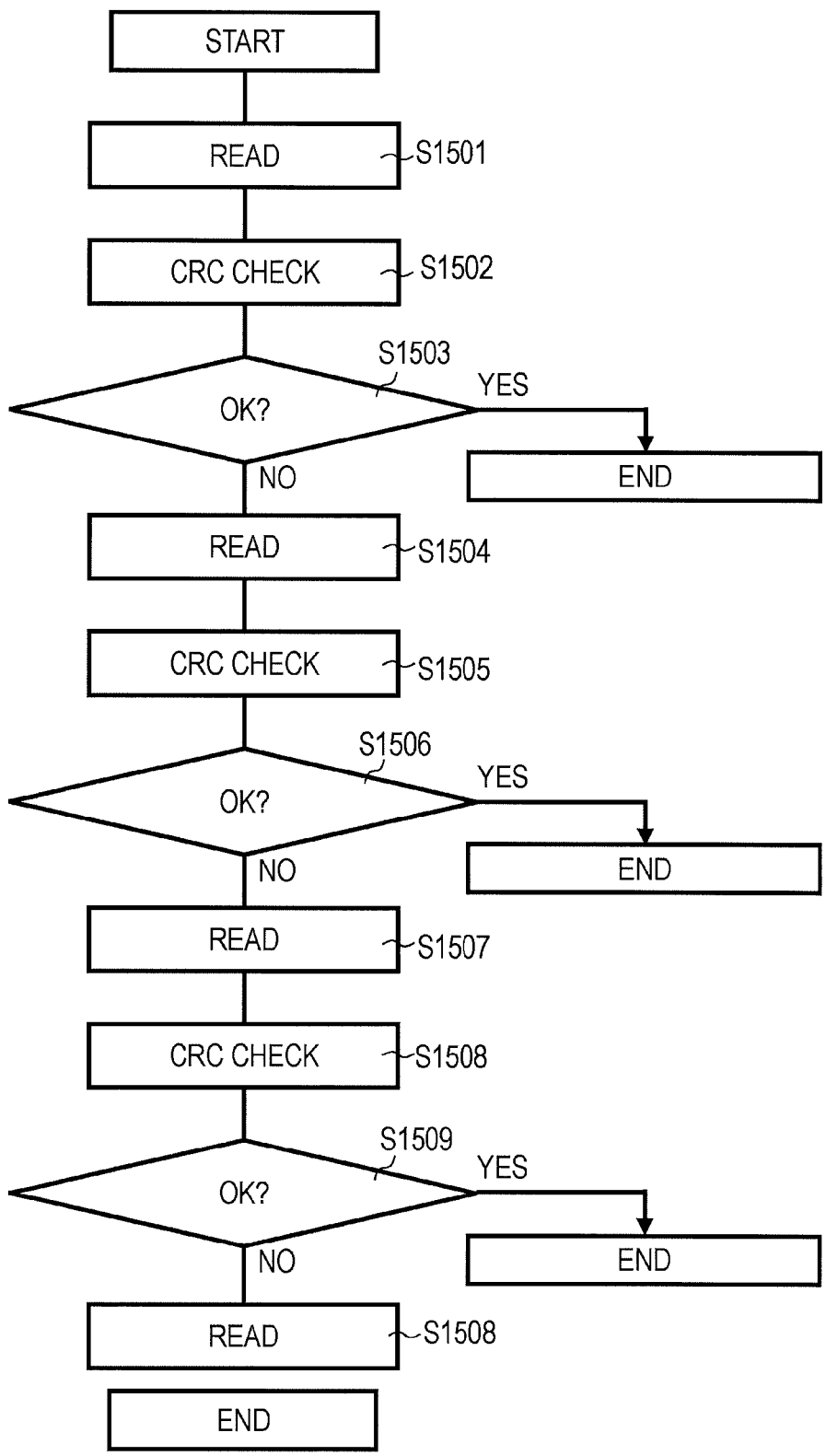
FIG. 15 is a read sequence of the invalidity management table 218 according to the embodiment in a transfer control unit 208 according to the embodiment.

The CPU 112 receives the completion notification of the write prohibition cancellation from the transfer control unit 208 and instructs the transfer control unit 208 to read the invalidity management table 218 from the nonvolatile memory 115 (step S1304). The transfer control unit 208 reads the invalidity management table 218 from the nonvolatile memory 115 (step S1305). The CPU 112 waits for a read completion notification of the invalidity management table 218 from the transfer control unit 208 (step S1306). A flow chart related to the read processing of the invalidity management table 218 (processing in step S1305) is shown in FIG. 15.

The CPU 112 receives the read completion notification of the invalidity management table 218 from the transfer control unit 208 and instructs the transfer control unit 208 to perform an erase confirmation of the "Block 0" storing the next generation invalidity management table 218 of the read invalidity management table 218 (step S1307). The transfer control unit 208 issues an erase confirmation command to perform the erase confirmation (step S1308). This is because the table management unit 206 stores the efficiently updated invalidity management table 218 (the next generation invalidity management table 218) in a case where the invalidity management table 218 is updated. The CPU 112 waits for an erase confirmation completion notification from the transfer control unit 208 (step S1309).

In a case where the CPU 112 determines that the "Block 0" storing the next generation invalidity management table 218 is not erased, the CPU 112 instructs the transfer control unit 208 to perform the erase processing on the "Block 0" (step S1310). Herein, the erase processing is a processing of deleting the data stored in the "Block 0" storing the next generation invalidity management table 218. The transfer control unit 208 issues the erase command and performs the erase processing on the "Block 0" storing the next generation invalidity management table 218 (step S1311). The CPU 112 waits for an erase completion notification from the transfer control unit 208 (step S1312).

In a case where the CPU 112 determines that the "Block 0" storing the next generation invalidity management table 218 is erased, the CPU 112 does not perform the instruction of the erase processing with respect to the transfer control unit 208.

Then, the CPU 112 refers to the power failure flag held in the EEPROM 181. The power failure flag is a flag indicating whether or not power failure occurs. In a case where the power failure flag is ON, the CPU 112, the transfer control unit 208 executes a power recovery processing. That is, the CPU 112 determines whether or not the power supply is recovered from the power failure, and the power supply is turned ON depending on whether or not the power failure flag is ON when the power supply of the disk array apparatus 100 is turned ON.

As a result after the CPU 112 confirms the power failure flag, when it is determined that the disk array apparatus 100 is not recovered from the power failure but this is a normal power supply, the CPU 112 instructs the transfer control unit 208 to confirm whether or not the nonvolatile memory 115 is subjected to the erase processing (step S1313). The transfer control unit 208 issues a command for the confirmation on the erase processing to perform the confirmation processing as to whether or not the nonvolatile memory 115 is subjected to the erase processing (step S1314). The erase processing referred herein is a processing of deleting the data in the region from the "Block 1" to the "Block 2047" constructing the nonvolatile memory 115 except the "Block 0". The CPU 112 waits for a completion notification of the confirmation on the erase processing from the transfer control unit 115 (step S1315).

In a case where the CPU 112 determines that the data from the "Block 1" to the "Block 2047" is not subjected to the erase processing, the CPU 112 instructs the transfer control unit 208 to perform for the erase processing the "Block 1" to the "Block 2047" (step S1316). The transfer control unit 208 issues the erase processing command to delete the data stored in the "Block 1" to the "Block 2047" (step S1317). The CPU 112 waits for a completion notification of the erase processing from the transfer control unit 208 (step S1318).

Then, the CPU 112 constructs the communication information (step S1319).

The communication information is composed of a command issued for executing a processing, memory addresses in the volatile memory 113 and the nonvolatile memory 115, the data amount transferred at once (transfer length) between the volatile memory 113 and the nonvolatile memory 115, and the AID (Area ID).

The communication management unit 205 writes the communication information in the internal registers 202 (step S1320).

Figure 17:
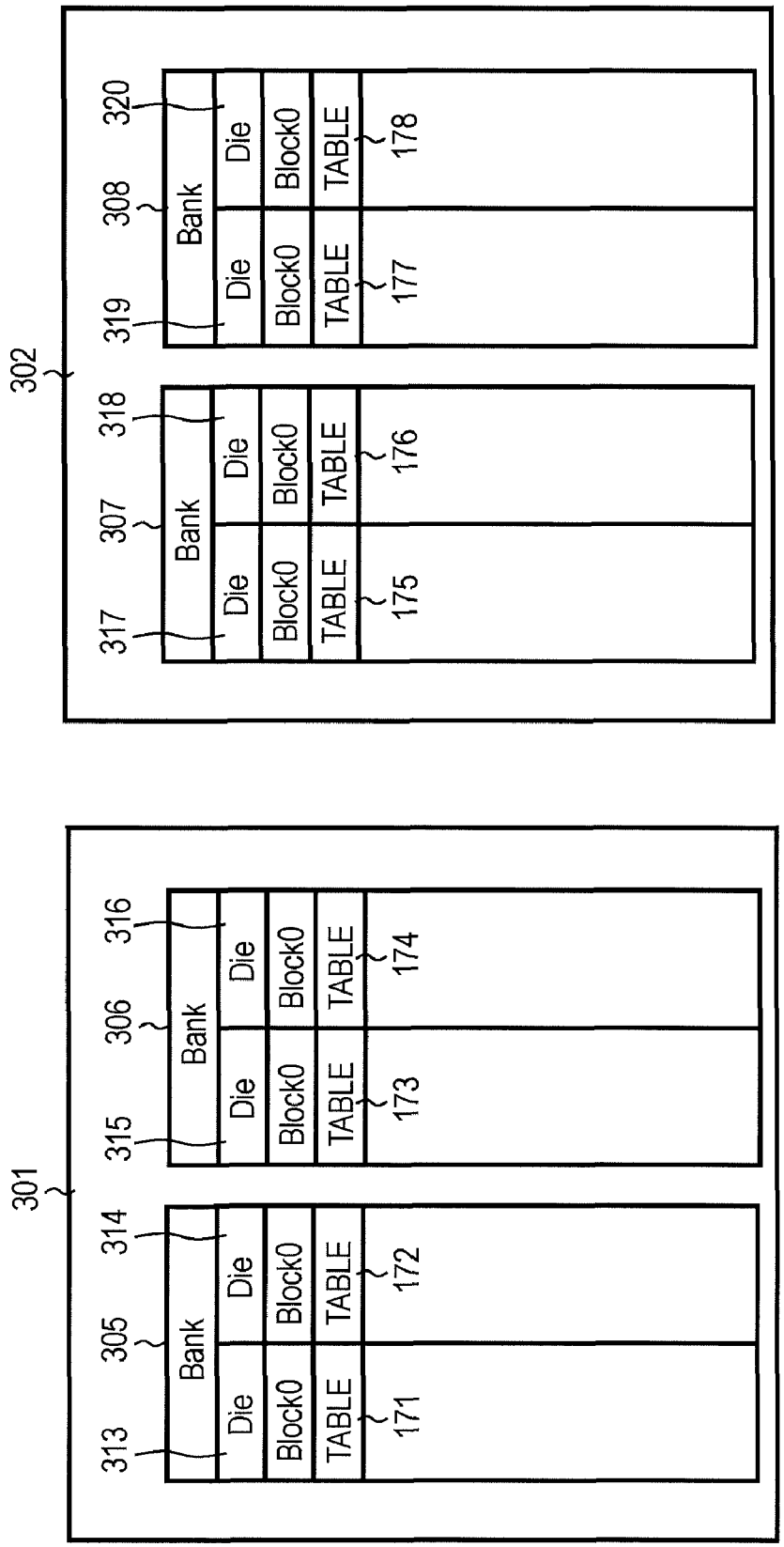
FIG. 17 is a conceptual diagram of the Banks 305 to 308 according to the embodiment.

FIG. 15 is a read sequence of the invalidity management table 218 according to the embodiment in the transfer control unit 208 according to the embodiment. Herein, for convenience sake in the description, the eight invalidity management tables 218 stored in the Banks 305 to 308 are referred to as invalidity management tables 171 to 178. FIG. 17 is a conceptual diagram of the Banks 305 to 308 according to the embodiment. It is shown that in the eight pieces of "Block 0" of the Banks 305 to 308, the invalidity management tables 171 to 178 are stored.

In the "Block 0" of the Bank 305, the latest invalidity management tables 171 and 172 are duplicated and stored. The invalidity management tables 173 and 174 in one generation before the invalidity management tables 171 and 172 are stored in the "Block 0" of the Bank 306. The invalidity management tables 175 and 176 in one generation before the invalidity management tables 173 and 174 are stored in the "Block 0" of the Bank 307. Then, the invalidity management tables 177 and 178 in one generation before the invalidity management tables 175 and 176 are stored in the "Block 0" of the Bank 308.

The transfer control unit 208 refers to the generation information stored in the EEPROM 181 and reads the latest invalidity management table 171 from the "Block 0" of the Bank 305 (step S1501). Then, the transfer control unit 208 checks the CRC data added to the invalidity management table 171 (step S1502) to determine whether or not the invalidity management table 171 is damaged (step S1503). In a case where the transfer control unit 208 determines that the invalidity management table 171 is not damaged (step S1503 YES), the transfer control unit 208 notifies the CPU 112 of the read completion of the invalidity management table 171 (END).

In a case where the transfer control unit 208 determines that the invalidity management table 171 is damaged (step S1503 NO), the transfer control unit 208 reads the invalidity management table 172 (step S1504). The invalidity management table 172 is the same data as the invalidity management table 171 and is data obtained through redundancy of the invalidity management table 171. Then, the transfer control unit 208 checks the CRC data added to the invalidity management table 172 (step S1505) to determine whether or not the invalidity management table 172 is damaged (step S1506). In a case where the transfer control unit 208 determines that the invalidity management table 172 is not damaged (step S1506 YES), the transfer control unit 208 notifies the CPU 112 of the read completion of the invalidity management table 172 (END).

In a case where the transfer control unit 208 determines that the invalidity management table 172 is damaged (step S1506 NO), the transfer control unit 208 reads the invalidity management table 173 in one generation before the invalidity management tables 171 and 172 (step S1507). Then, the transfer control unit 208 checks the CRC data added to the invalidity management table 173 (step S1508) to determine whether or not the invalidity management table 173 is damaged (step S1509). In a case where the transfer control unit 208 determines that the invalidity management table 173 is not damaged (step S1509 YES), the transfer control unit 208 notifies the CPU 112 of the read completion of the invalidity management table 173 (END).

In a case where the transfer control unit 208 determines that the invalidity management table 173 is damaged (step S1509 NO), the transfer control unit 208 reads the invalidity management table 174 (step S1510).

After that, in a similar manner, the transfer control unit 208 checks the invalidity management tables 174, 175, 176, 177, and 178 in order until it is determined that the undamaged invalidity management table exists through the check on the CRC data, and the CPU 112 is notified of the read completion of the undamaged invalidity management table (in the flow chart described in FIG. 15, the CRC check on the invalidity management tables 174, 175, 176, 177, and 178 and the read step are omitted.). According to the embodiment, the transfer control unit 208 may simultaneously read the invalidity management table in the same generation as the invalidity management tables 171 and 172 to check on the CRC data.

Figure 16:
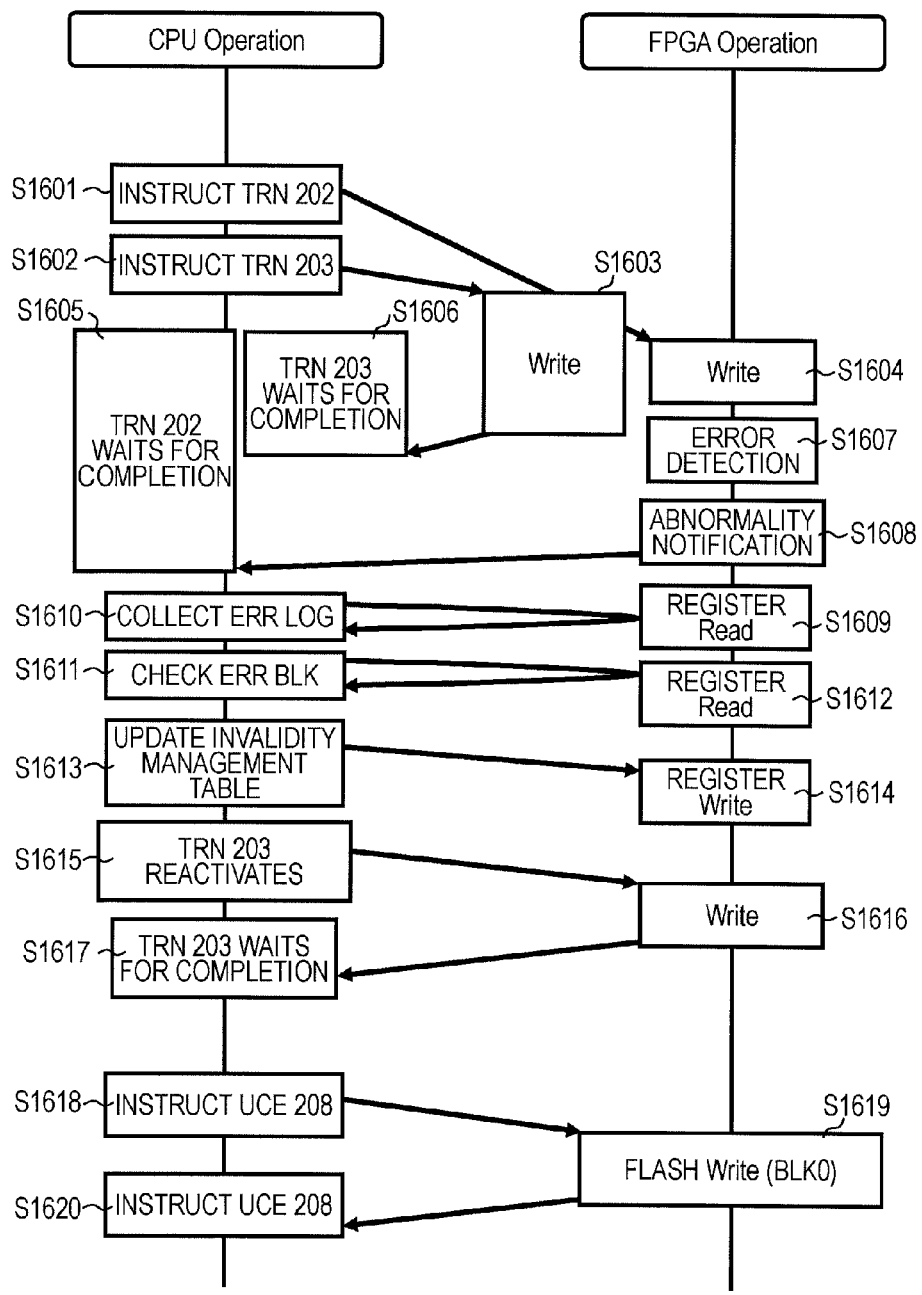
FIG. 16 is a sequence diagram of a CPU 112 and the FPGA 114 in a case power failure occurs according to the embodiment.

FIG. 16 is a sequence diagram of the CPU 112 and the FPGA 114 according to the embodiment in a case where power failure occurs.

The processing flow for the data saving into the nonvolatile memory 115 in the case of power failure is shown in FIG. 11. The data transfer unit 202 saves the data held in the volatile memory 113 into the nonvolatile memory 115. For that reason, a detail of the data write processing in step S1601 to step S1606 in FIG. 16 and step S1614 to step S1616 is shown in FIG. 11.

First, in a case where the electric power supply to the CM 105 is switched from the external source to the backup unit 103 (in the case of power failure), the CPU 112 instructs the transfer control units 202 and 203 to save the data held in the volatile memory 113 into the nonvolatile memory 115 (steps S1601, 1602). The data transfer units 202 and 203 perform the transfer control on the data held in the volatile memory 113 to the nonvolatile memory 115 (steps S1603, 1604). The CPU 112 waits for a notification of the data saving completion from the data transfer units 202 and 203 (steps S1605, 1606).

Then, according to the embodiment, a case will be described in which an error is generated during the data saving of the data transfer unit 202 and the invalidity management table 218 is updated. In a case where an error is not generated during the data saving, the data transfer units 202 and 203 save the data held in the volatile memory 113 into the nonvolatile memory 115 so that a backup processing of the disk array apparatus 100 is completed.

The data transfer unit 203 completes the data saving. Then, the data transfer unit 202 detects an error during the data saving (step S1607). The data transfer unit 202 detects the error and notifies the CPU 112 of the abnormality (step S1608). The CPU 112 requests the data transfer unit 202 to collect an error log (step S1610). The CPU 112 reads an error log from a register (such as the internal registers 802 described in FIG. 8) of the nonvolatile memory 115 to be transferred to the CPU 112 (step S1609). The CPU 112 collects the error log (step S1610). In order to check the sector where the error exists, the CPU 112 requests the data transfer unit 202 to transfer information (such as an address) on the sector where the error exists (step S1611). The data transfer unit 202 reads the information (such as the address) on the sector where the error exists from the register to be transferred to the CPU 112 (step S1612). The CPU 112 checks the sector where the error exists (step S1611).

From the check result in step S1613, the CPU 112 updates the invalidity management table 218 (step S1613). The data transfer unit 202 writes an update history in the register (step S1614).

Then, the CPU 112 instructs the data transfer unit 202 again to save the data held in the volatile memory 113 into the nonvolatile memory 115 (step S1615). The data transfer unit 202 saves the data again into the nonvolatile memory 115 (step S1616).

The CPU 112 instructs the transfer control unit 208 to perform a write back processing of the invalidity management table 218 (step S1618). The transfer control unit 208 stores the updated invalidity management table 218 in the "Block 0" of the nonvolatile memory 115 (step S1619). The CPU 112 waits for a notification of the write back processing completion of the invalidity management table 218 (step S1620).

[2.4.7. Memory Control Units (ONC) 210 and 211]

The memory control units 210 and 211 perform an interface control on the nonvolatile memory 115. The memory control units 210 and 211 perform the data write to the nonvolatile memory 115 and the data read from the nonvolatile memory 115. By controlling the process of the nonvolatile memory 115, the memory control units 210 and 211 perform the data write to the nonvolatile memory 115 and the data read from the nonvolatile memory 115.

[2.4.8. Data Conversion Control Units (NFC) 212 and 213]

The data conversion control units 212 and 213 controls an IP of the nonvolatile memory 115. The data conversion control units 212 and 213 execute a processing of establishing a consistency between the data of the volatile memory 113 and the nonvolatile memory 115. When the data conversion control unit 212 receives the data from the data transfer unit 202, the data is converted in a format so as to be stored in the nonvolatile memory 115 and transferred to the memory control unit 210. Also, when the data conversion control unit 212 receives the data from the memory control unit 210, the data is converted in a format so as to be stored in the volatile memory 113 and transferred to the data recovery unit 204. In a similar manner, when the data conversion control unit 213 receives the data from the data transfer unit 203, the data is converted in a format so as to be stored in the nonvolatile memory 115 and transferred to the memory control unit 211. Also, the data conversion control unit 213 receives the data from the memory control unit 211, the data is converted in a format so as to be stored in the volatile memory 113 and transferred to the data recovery unit 204.

[2.5. Nonvolatile Memories 115 and 121]

Next, according to the embodiment, the nonvolatile memories 115 and 121 for saving the data held by the volatile memory 113 will be described.

The FPGA 114 according to the embodiment saves the data held by the volatile memory 113 into the nonvolatile memory 115 on the basis of the instruction of the CPU 112. The FPGA 120 saves the data held by the volatile memory 119 into the nonvolatile memory 121 on the basis of the instruction of the CPU 118.

The nonvolatile memory 115 is a storage medium for saving the data held by the volatile memory 113 to be stored at the time of power failure. Similarly, the nonvolatile memory 121 is a storage medium for saving the data held by the volatile memory 119 to be stored at the time of power failure. The nonvolatile memory 115 is connected to the FPGA 114. The volatile memory 113 and the FPGA 114 are connected to the CPU 112. The nonvolatile memory 115 has the invalidity management table. The region where the invalidity management table is stored is a region where a larger number of data write times is guaranteed than other regions in the nonvolatile memory 115. This region for storing the invalidity management table is the "Block 0" shown in FIG. 4. The data transfer unit 202 transfers the invalidity management table 218 stored in the table management unit 206 to the nonvolatile memory 115 to be stored in the "Block 0" of the memory chips 301 and 302. Similarly, the data transfer unit 203 also transfers the invalidity management table 219 stored in the table management unit 207 to the nonvolatile memory 115 to be stored in the "Block 0" of the memory chips 303 and 304.

Similarly, the nonvolatile memory 121 is connected to the FPGA 120. The volatile memory 119 and the FPGA 120 are connected to the CPU 118. The nonvolatile memory 119 has the invalidity management table. The configuration of the nonvolatile memory 121 is equivalent to the configuration of the nonvolatile memory 115. Hereinafter, a description will be given of the configuration of the nonvolatile memory 115 in detail.

[2.5.1. Configuration 1 of Nonvolatile Memory 115]

Figure 3:
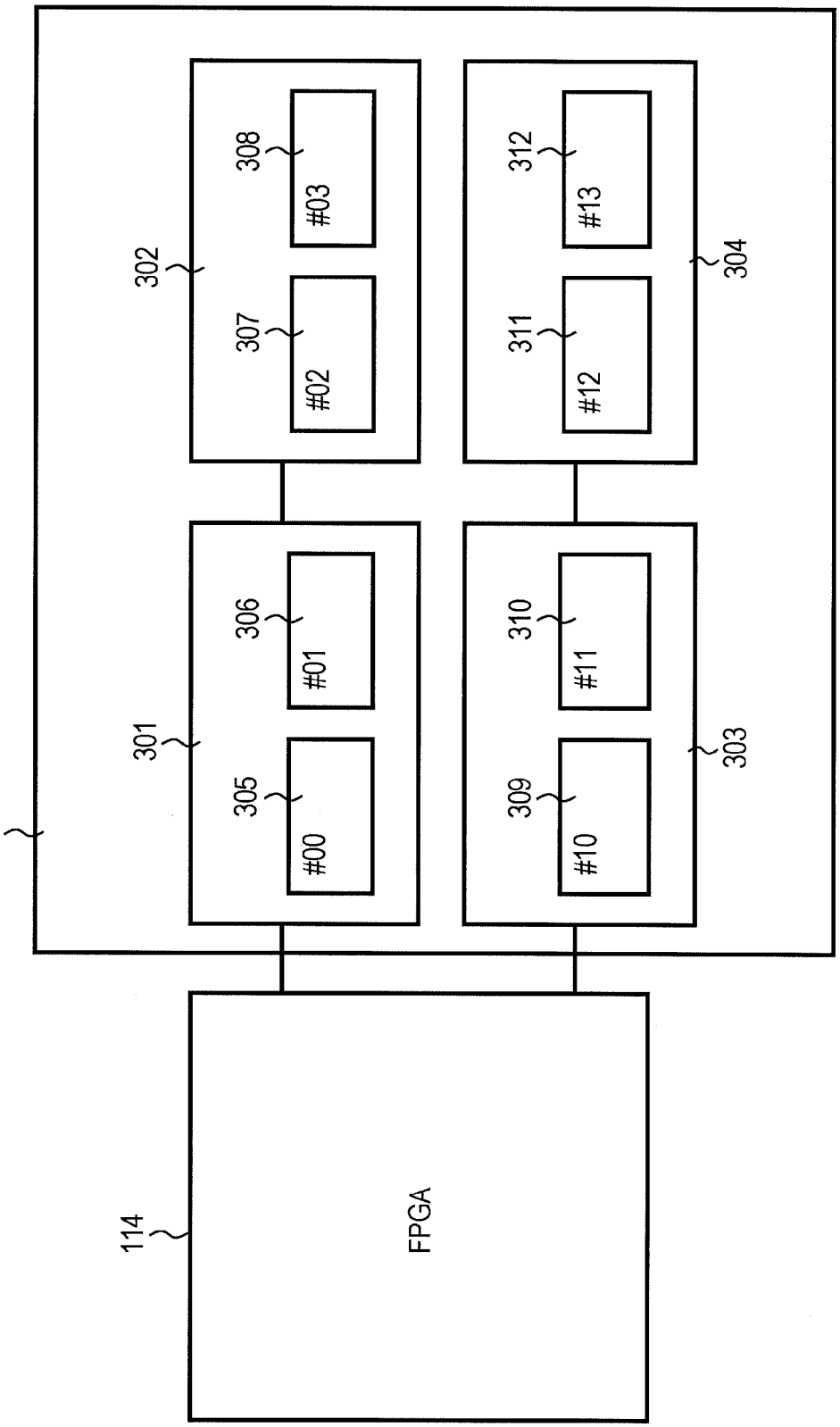
FIG. 3 shows a configuration of a nonvolatile memory 115 according to the embodiment.

FIG. 3 shows a configuration of the nonvolatile memory 115 according to the embodiment.

The nonvolatile memory 115 is composed of memory chips 301, 302, 303, and 304. The memory chips 301, 302, 303, and 304 are units for dividing the data stored in the nonvolatile memory 115 for management.

The memory chip 301 is composed of the Banks 305 and 306. Similarly, the memory chip 302 is composed of the Banks 307 and 308. The memory chip 303 is composed of the Banks 309 and 310. The memory chip 304 is composed of the Banks 311 and 312.

The Banks 305 to 312 are also units for dividing the data in the nonvolatile memory 115 for management. Hereinafter, by using FIG. 4, a configuration of a detail for a part of the nonvolatile memory 115 (the memory chips 301 and 302: the Banks 305 to 308) will be described. FIG. 4 is a detail view of the Banks 305 to 308 related to the nonvolatile memory 115 according to the embodiment. The memory chips 303 and 304 (the Banks 309 to 312) have a configuration equivalent to the memory chips 301 and 302 (the Banks 305 to 308), and therefore a description will be omitted.

Figure 6:
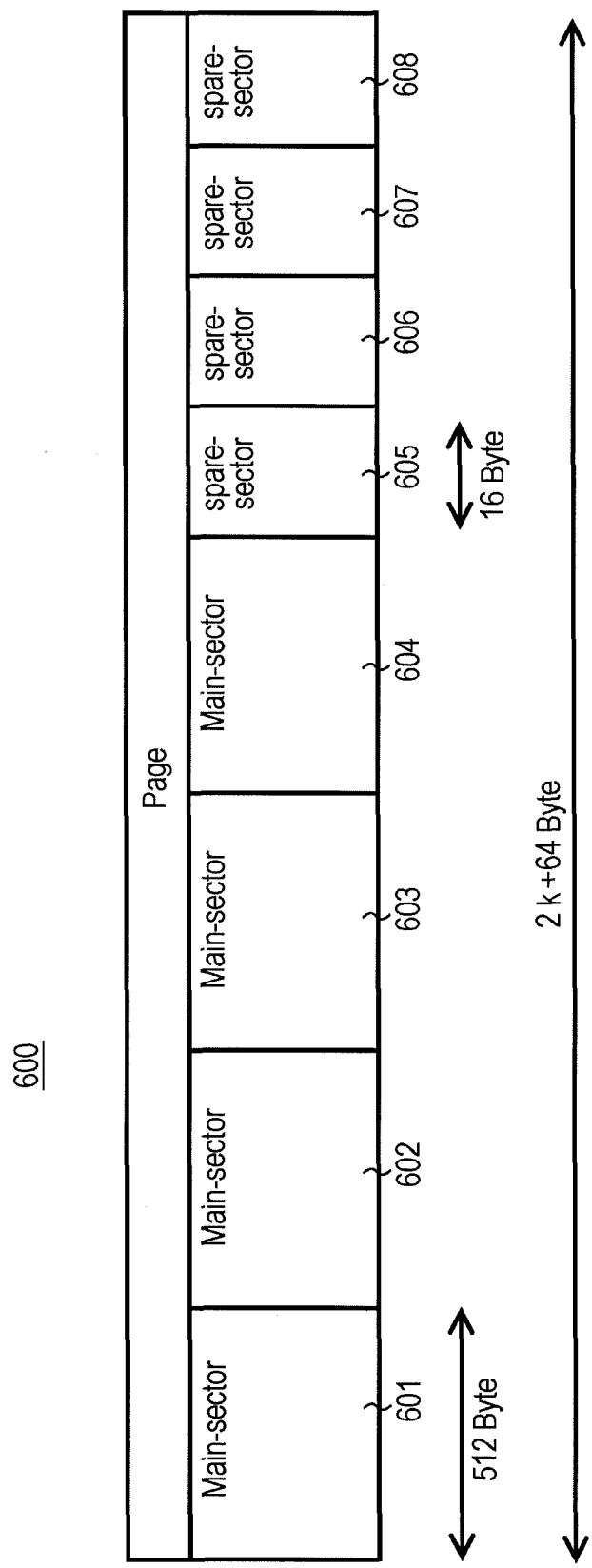
FIG. 6 is a block diagram of a Page 600 according to the embodiment.

The Bank 305 is composed of the Dies 313 and 314. The Die 313 is composed of 2048 pieces of Blocks from Block 0 to Block 2047. The Die 314 is also composed of 2048 pieces of Blocks from the Block 0 to the Block 2047. Then, the Block 0 to the Block 2047 of the Dies 313 and 314 are respectively composed of 64 pieces of Pages from Page 0 to Page 63. The "Die", the "Block", and the "Page" are also units for regions for storing the data in the nonvolatile memory. The "Die" is a unit for storing the data physically separated in the nonvolatile memory 115 (unit for the hardware configuration). According to the embodiment, the "Page" has 2 k Bytes. FIG. 6 shows a hardware configuration of the Die 313. A nonvolatile memory array 810 of the Die 313 is 2048 pieces of "the Block 0 to the Block 2047" described in FIG. 4. For that reason, the nonvolatile memory 115 is provided with 16 nonvolatile memory arrays. Then, as the Dies 313 to 320 are provided with two data buffers each (such as the data buffers 805 and 806 described in FIG. 6), the nonvolatile memory 115 has 32 data buffers. Then, a state machine 807 of the Die 313 stores the data transferred from the FPGA 114 (the Page data) in the nonvolatile memory array 810. The other Dies 314 to 320 also have a state machine, and these state machines store the data transferred from the FPGA 114 (the Page data) in the nonvolatile memory arrays respectively provided to the Dies 314 to 320.

Similarly, the Bank 306 is composed of the Dies 315 and 316. The Dies 315 and 316 are also respectively composed of 2048 pieces of Blocks from the Block 0 to the Block 2047. Then, the Block 0 to the Block 2047 of the Dies 315 and 316 are respectively composed of 64 pieces of Pages from the Page 0 to the Page 63.

Similarly, the Bank 307 is composed of the Dies 317 and 318. The Dies 317 and 318 are also respectively composed of 2048 pieces of Blocks from the Block 0 to the Block 2047. Then, the Block 0 to the Block 2047 of the Dies 317 and 318 are respectively composed of 64 pieces of Pages from the Page 0 to the Page 63.

Similarly, the Bank 308 is composed of the Dies 319 and 320. The Dies 319 and 320 are also respectively composed of 2048 pieces of Blocks from the Block 0 to the Block 2047. Then, the Block 0 to the Block 2047 of the Dies 319 and 320 are respectively composed of 64 pieces of Pages from the Page 0 to the Page 63.

[2.5.2. Configuration 2 of Nonvolatile Memory 115]

Also, a configuration of the nonvolatile memory 115 in a unit for the FPGA 114 to write the data will be described. A part of the nonvolatile memory 115 (the memory chips 301 and 302) is composed of 1024 pieces of "Area". That is, the nonvolatile memory 115 is composed of 2048 pieces of "Area". The "Area" is a region where the FPGA 114 writes the data in the nonvolatile memory 115 on the basis of a one-time instruction from the CPU 112. The FPGA 114 identifies the "Area" on the basis of the invalidity management tables 218 and 219 for management.

According to the embodiment, this "Area" is composed of 16 pieces of "Block". The 16 pieces of "Block" is a "Block" of the data stored in the nonvolatile memory 115 via 16 data buffers (such as the data buffers 805 and 806 described in FIG. 6) provided to the memory chips 301 and 302 (the Dies 313 to 320), respectively. In other words, the "Area" is a region for storing a certain amount of data transferred to the nonvolatile memory 115 via the different data buffers provided to the nonvolatile memory 115. The FPGA 114 performs the data transfer control from the volatile memory 113 to the nonvolatile memory 115 in "Area" unit. According to the embodiment, the CPU 112 instructs the FPGA 114 to perform the data transfer for each "Area".

Then, an "AREA" of the nonvolatile memory 115 is composed of "LOGICAL AREA" and "REPLACEMENT AREA".

Figure 10:
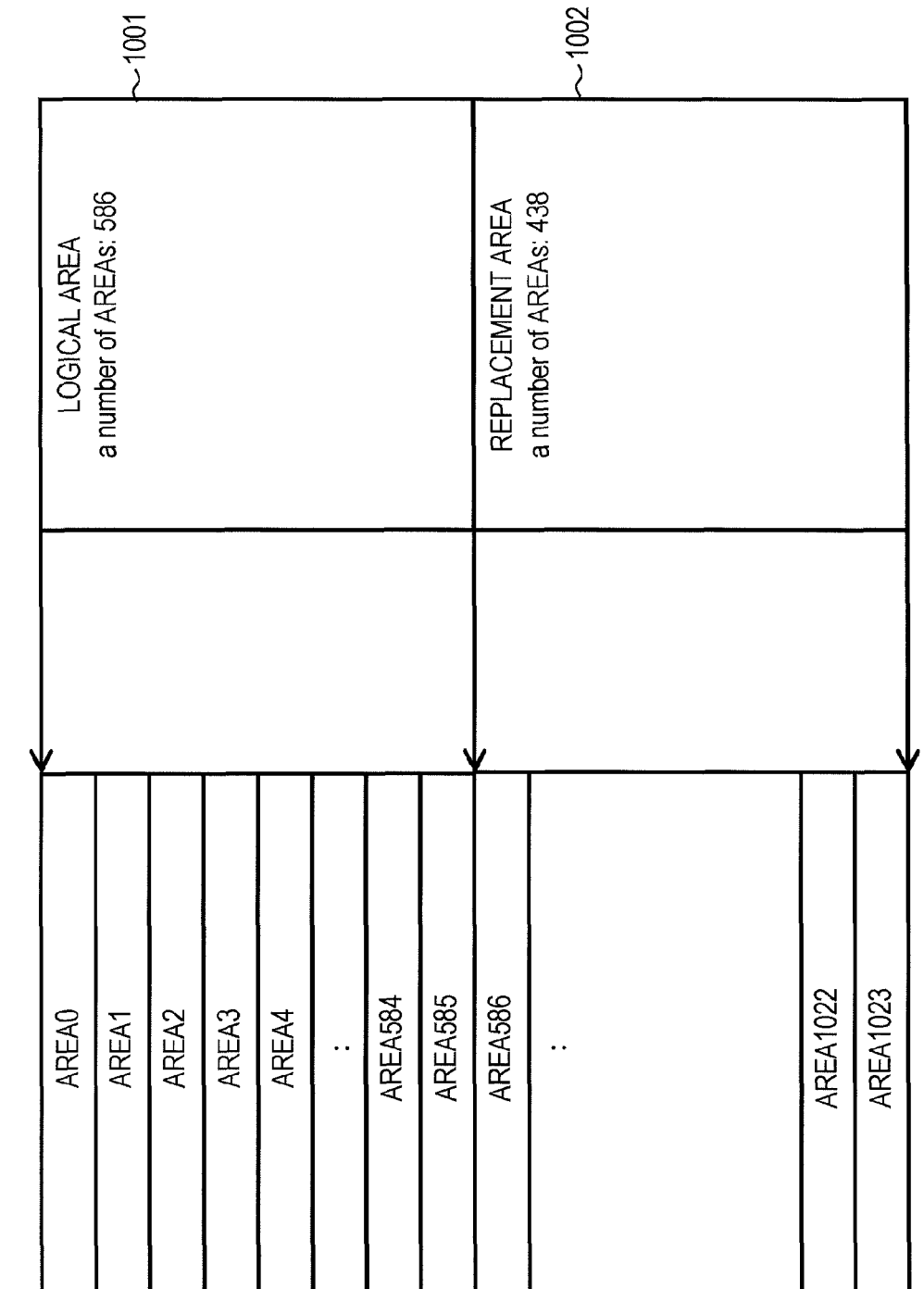
FIG. 10 is a conceptual diagram of an AREA 0 to an AREA 1023 according to the embodiment.

FIG. 10 is a conceptual diagram of "AREA 0 to AREA 1023" in the memory chips 301 and 302 of the nonvolatile memory 115 according to the embodiment. According to the embodiment, a logical area 1001 is composed of the area 0 to the area 585, and a replacement area 1002 is composed of the area 586 to the area 1023. The memory chips 303 and 304 are also composed of the "LOGICAL AREA" and the "REPLACEMENT AREA".

The FPGA 114 saves the data held by the volatile memory 113 into the logical area 1001 of the nonvolatile memory 115 (performs the data transfer). While the FPGA 114 is in course of writing the data in a particular area of the areas (the area 0 to the area 585) constituting the logical area 1001, in a case where the FPGA 114 determines that the error data generated in the data write cannot be restored, the FPGA 114 rewrites the data planed to be written in the particular area of again in one of the area 586 to the area 1023 constituting the replacement area 1002. The FPGA 114 performs a "determination on whether or not the error data is restorable" on the basis of whether or not this can be restored by the parity data generated by the FPGA 114. As described in [2.4.2. Data transfer units (TRN) 202 and 203], the data transfer units 202 and 203 of the FPGA 114 generates the parity data.

Similarly, also as to the "Area" in the memory chips 303 and 304, with a standard for writing the data in "the AREA 0 to the AREA 1023" in the memory chips 301 and 302, the FPGA 114 writes the held data in the volatile memory 113. The "standard for writing" means "determination on whether or not the error data is restorable" and "in a case it is determined that the error data cannot be restored, this is rewritten in the replacement area".

[2.5.3. Small Area 501]

Figure 5:
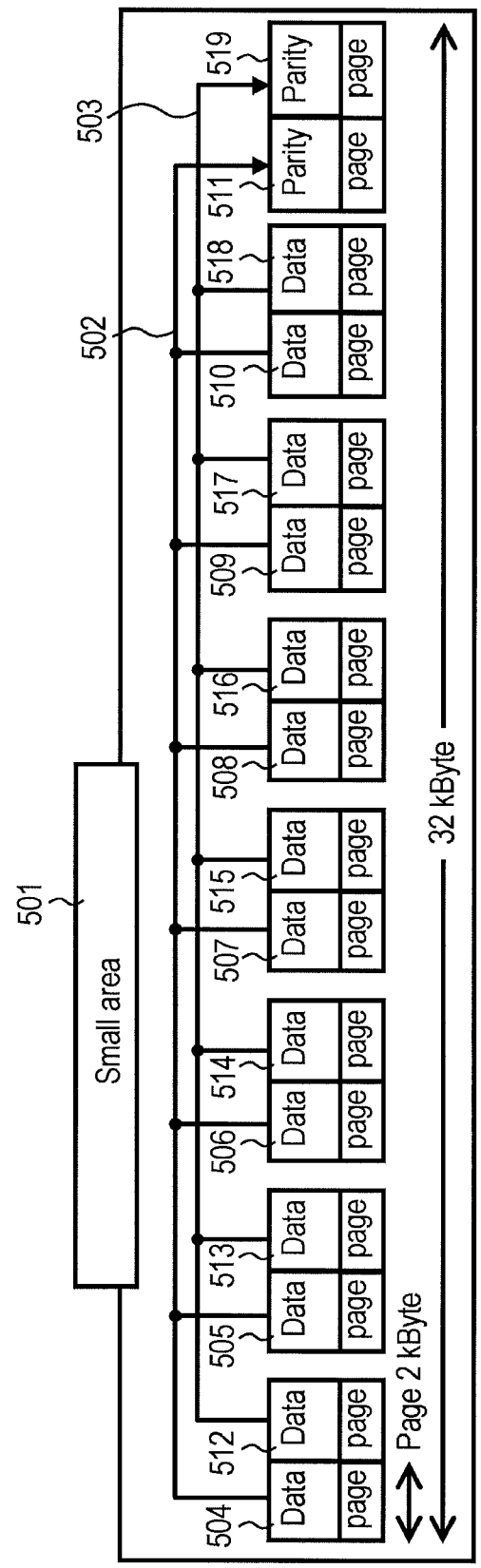
FIG. 5 is a block diagram of a small area 501 of the nonvolatile memory 115 according to the embodiment.

FIG. 5 is a block diagram of a small area 501 of the nonvolatile memory 115 according to the embodiment.

The small area 501 is composed of 16 pieces of "Page". The size of the small area 501 is 32 k Bytes. The respective pieces of "Area" of the nonvolatile memory 115 is composed of 64 small areas (such as the small area 501).

Also, Page data 504 to 510 and 512 to 518 and the parity data 511 and 519 stored in 16 pieces of "Page" of the small area 501 construct stripes 502 and 503. The stripe 502 is composed of the Page data 504 to 510 and the parity data 511. Similarly, the stripe 503 is composed of the Page data 512 to 518 and the parity data 519.

The stripe 502 adopts a configuration of so-called (7+1) RAID5 on the basis of the Page data 504 to 510 and the parity data 511. The stripe 502 is composed of the Page data 504 to 510 and the parity data 511 stored in the "page" in the region where the FPGA 114 writes the data in the nonvolatile memory 115 (the "Area") on the basis of a one-time instruction from the CPU 112. Also, the stripe 502 is a stripe constituting RAID5 with the Page data stored in a predetermined "Page" in each of the "Dies 313 to 320" indicating the physically separated unit. That is, each "Page" storing the Page data 504 to 510 and the parity data 511 constituting the stripe 502 is physically (as a hardware configuration) separated.

Herein, a case will be considered in which the stripe is formed of the Page data stored in the "Page" on the same hardware configuration. As compared with a probability that an error occurs in two or more pieces of the Page data in the stripe, a probability that an error occurs in two or more pieces of the Page data 504 to 510 and the parity data 511 constituting the stripe 502 is lower. This is because the "Page" storing the Page data 504 to 510 and the parity data 511 constituting the stripe 502 is physically separated.

In particular, in a case where the nonvolatile memory 115 is a NAND type flash memory, an error tends to occur such as a failure of the data write in the Die unit separated as the hardware configuration. For that reason, as described above, it is more useful to construct the stripe of RAID5 by the Page data stored in the "Page" belonging to different pieces of "Die".

Also, the Page data 504 to 510 and the parity data 511 constituting the stripe 502 are data transferred via a plurality of data buffers provided to the nonvolatile memory 115 which are different data buffers.

Similarly, the stripe 503 also adopts the (7+1) RAID5 configuration on the basis of the Page data 512 to 518 and the parity data 519. The stripe 503 is also composed of the Page data 512 to 518 and the parity data 519 stored in the "page" in the region where the FPGA 114 writes the data in the nonvolatile memory 115 (the "Area") on the basis of a one-time instruction from the CPU 112. Also, the stripe 503 is a stripe constituting RAID5 by the Page data stored in a predetermined "Page" in each of the "Dies 313 to 320" indicating the physically separated unit.

[2.5.3.1. Page 600]

FIG. 6 is a block diagram of the Page 600 according to the embodiment. The Page 600 is a region equivalent to the "Page" shown in FIG. 4 and FIG. 5 and is a region within the nonvolatile memory 115. The Page 600 is composed of main-sectors 601 to 604 and spare-sectors 605 to 608.

Each of the main-sectors 601 to 604 stores main data indicating Page data original user information. According to the embodiment, the Page 600 stores four pieces of main data. The size of the main data is 512 Bytes. Each of the spare-sectors 605 to 608 stores spare data related to a consistency between the main data and the like. According to the embodiment, the Page 600 stores four pieces of spare data. The size of the spare data is 16 Bytes.

[2.5.3.2. Spare-Sector 700]

Figure 7:
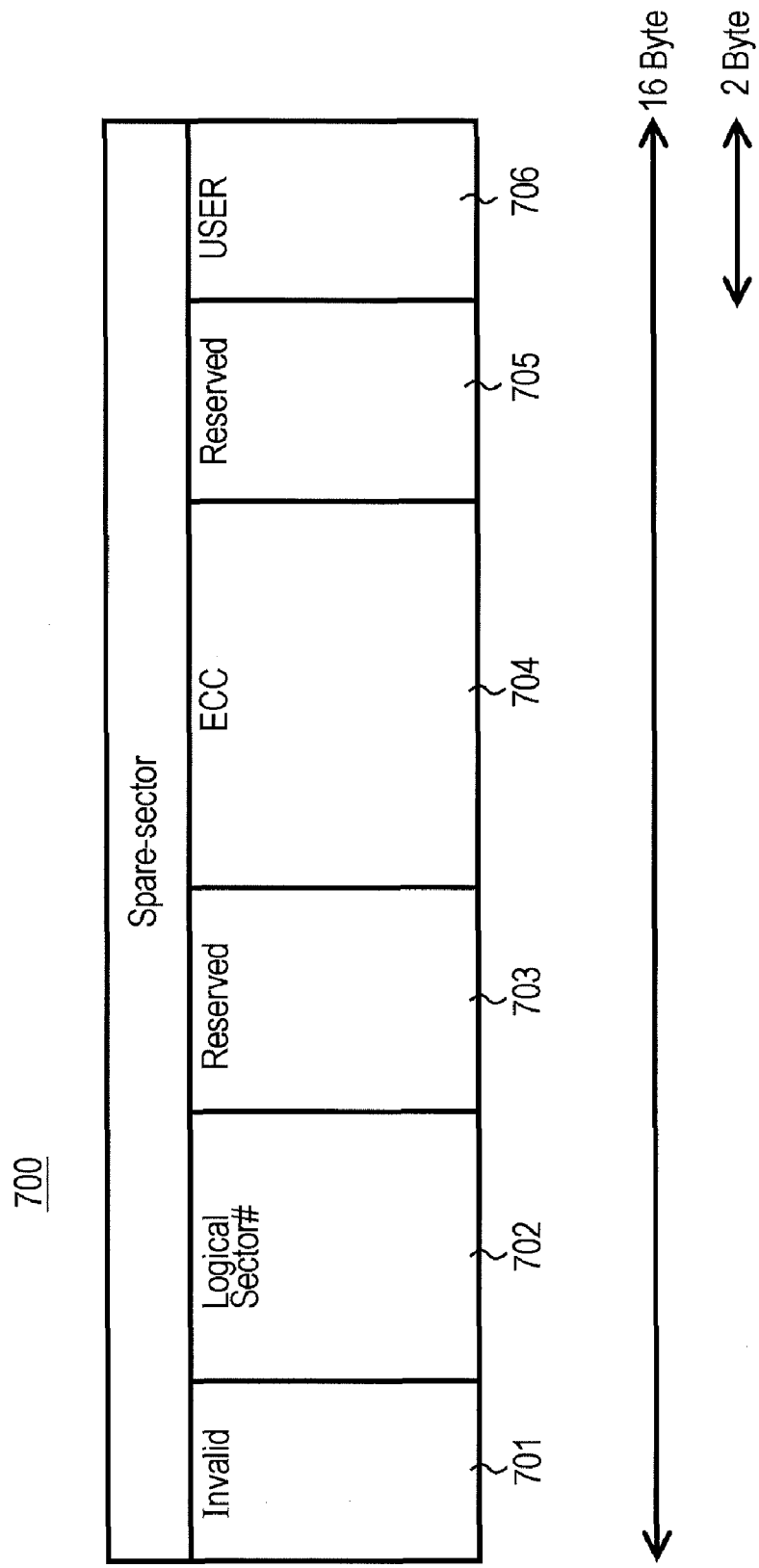
FIG. 7 is a block diagram of a spare-sector 700 according to the embodiment.

FIG. 7 is a block diagram of the spare-sector 700 according to the embodiment. The spare-sector 700 is a region equivalent to the spare-sectors 605 to 608 described in FIG. 6 and a region within the nonvolatile memory 115. The spare-sector 700 is composed of the Invalid region 701, a Logical-sector 702, Reserve regions 703 and 705, an ECC region 704, and the User region 706.

The Invalid region 701 stores information as to whether or not the main sector corresponding to the spare-sector 700 is bad at the time of factory shipment of the nonvolatile memory 115.

The Logical-sector 702 stores information for identifying the spare-sector 700. The Reserve regions 703 and 705 are reserved empty region. The ECC region 704 is a region storing ECC data generated in the nonvolatile memory 115. The ECC data is data for correcting a bit error of the main data. The User region 706 stores the CRC data or the AID data.

[2.5.4. Dies 313 to 320]

FIG. 8 is a hardware block diagram of the Die 313 according to the embodiment. The other Dies 314 to 320 have also a similar hardware configuration to the Die 313.

The Die 313 is a part surrounded by a dotted line in FIG. 8. The Die 313 performs a data transfer with the FPGA 114 via a Host Interface 801.

The Die 313 is composed of internal registers 802, a buffer RAM 803, a state machine 807, an error correction logic 809, and the nonvolatile memory array 810. The buffer RAM 803 is composed of Boot RAM 804 and Data RAMs 805 and 806. Also, the state machine 807 holds a boot loader 808. The boot loader 808 is a problem for reading a control program from the internal registers 802 into the state machine 807 to activate the Die 313 when the Die 313 starts the data transfer control.

The internal registers 802 stores an address, a command, and a configuration (setting information), an error log in the data write and read, and the like. The state machine 807 reads these address, command, and configuration from the internal registers 802 to perform a transfer control. The address is an address of data in the nonvolatile memory array 810. The command is an order command issued when the Die 313 performs the data transfer control.

The nonvolatile memory array 810 is composed of 2048 pieces of "Block" shown in FIG. 4 and a storage unit for data. Then, the Die 313 stores the data via the data buffer 805 in the Block 0, the Block 2, the Block 4, the Block 6, . . . , the Block 2046 (a part of the nonvolatile memory array 810) belonging to the Die 313 of FIG. 4. Also, the Die 313 stores the data via the data buffer 806 in the Block 1, the Block 3, the Block 5, the Block 7, . . . , the Block 2047 belonging to the Die 313 of FIG. 4. This means that the Die 313 stores the data via the data buffer 805 in an even-numbered Block. This means that the Die 313 stores the data via the data buffer 806 in an odd-numbered Block.

The Die 313 the data in the nonvolatile memory array 810 by using two buffers of the data buffers 805 and 806. The Die 313 holds the data in the data buffers 805 and 806 in the "Page" unit shown in FIG. 4. Then, the state machine 807 of the Die 313 transfers the data to the nonvolatile memory array 810 via the data buffers 805 and 806. In other words, the Die 313 transfers the data to the nonvolatile memory array 810 via the data buffers 805 and 806 in the "Page" unit.

The state machine 807 transfers the data to the nonvolatile memory array 810 via the data buffer 805, and also the state machine 807 holds data to be transferred to the nonvolatile memory array 810 next in the data buffer 806. According to this, the Die 313 can efficiently store the data in the nonvolatile memory array 810. Herein, the "data to be transferred to the nonvolatile memory array 810" is "data to be subsequently transferred, after the state machine 807 completes the transfer of the data held in the data buffer 805 to the nonvolatile memory array 810, to the nonvolatile memory array 810 by the state machine 807". Then, the state machine 807 transfers the data via the data buffer 806 to the nonvolatile memory array 810, and also the state machine holds the data to be transferred to the nonvolatile memory array 810 in the data buffer 805.

The other Dies 314 to 320 are also respectively provided with data buffers equivalent to the data buffers 805 and 806 and a nonvolatile memory array equivalent to the nonvolatile memory array 810. Then, the Dies 314 to 320 also respectively use the respectively provided data buffers to transfer the data in the "Page" unit to the nonvolatile memory arrays respectively provided to the Dies 314 to 320.

As shown in FIG. 5, the nonvolatile memory 115 constructs the stripes of RAID5 (the stripes 502, 503, and the like) by the Page data stored in a predetermined "Page" in each of the "Dies 313 to 320" indicating the physically separated unit, and the parity data. That is, the nonvolatile memory 115 subjects the data (the Page data) to be transferred via physically different data buffers to the redundancy (configuration of RAID5). As the nonvolatile memory 115 constructs the stripes of RAID5 (the stripes 502, 503, and the like) in a predetermined page unit, even when an error of one piece of data (the Page data) in the stripes (the stripes 502, 503, and the like) occurs, the restoration can be realized. According to this, in a case where the error data can be restored by the FPGA 114 from the redundant configuration of the data in the nonvolatile memory 115, the FPGA 114 can transfer the data (data of about 2 M Bytes) to the nonvolatile memory 115 without newly writing back the data started to be transferred on the basis of the command of the CPU 112 from the beginning even when an error is generated in the process of the data transfer from the volatile memory 113 to the nonvolatile memory 115. This is because after the FPGA 114 completes the write of the data in the nonvolatile memory 115, the error data may be restored.

Also, the boot RAM 804 is a storage region for primarily holding information for activating the Die 313. Also, the error correction logic 809 is a circuit for correcting the data where the transfer error exists in the Die 313.

The above-mentioned state can be rephrased as follows. The nonvolatile memory 115 is provided with a plurality of data buffers. Then, a region in the nonvolatile memory 115 (region for storing the data) is allocated to each of the data buffers. The FPGA 114 stores the data in the area in the nonvolatile memory 115 (region for storing the data) allocated to each of the data buffers via the plurality of data buffers provided to the nonvolatile memory 115.

The FPGA 114 continuously writes (stores) a certain amount of data in the nonvolatile memory 115 on the basis of the instruction from the CPU 112. On the basis of the one-time instruction from the CPU 112, if the FPGA 114 writes more data in the nonvolatile memory 115, the time for the FPGA 114 to writes the data in the nonvolatile memory 115 is shortened. This is because as the FPGA 114 writes more data in the nonvolatile memory 115, the number of instructions to the FPGA 114 from the CPU 112 may be small.

On the other hand, the more the FPGA 114 writes data in the nonvolatile memory 115 on the basis of the one-time instruction, the higher the probability is that an error is generated in the process of the data write. In a case where the error is generated in the process of the data write, the FPGA 114 rewrites the data from the beginning again on the basis of the instruction. For that reason, the more the rewrite occurs because of the error generation, the longer it accordingly takes for the FPGA 114 to write (save) the data in the non-volatile memory 115. Furthermore, in a case where the error is generated in course of the data write, and the FPGA 114 writes back the data to the original region of the nonvolatile memory 115 again, after the data started to be written in the nonvolatile memory 115, which is the data whose write succeeds, is deleted from the nonvolatile memory 115 on the basis of the instruction from the CPU 112, and it need to write back again. For that reason, it also takes the time for the FPGA 114 to delete (erase) the data whose write succeeds before the error generation from the nonvolatile memory 115. In a case where a plurality of instructions is issued from the CPU, the FPGA 114 performs the data write management for each instruction. The FPGA 114 writes the data in the nonvolatile memory 115 by a certain data amount each. In a case where an error is generated, the FPGA 114 deletes the data whose write succeeds in a range of the certain data amount where the error is generated.

For that reason, according to the embodiment, the redundant configuration is adopted in a certain data unit (stripe unit of the stripes 502, 503, and the like) in the data which the FPGA 114 continuously writes in the nonvolatile memory 115 on the basis of the instruction from the CPU 112. That is, the FPGA 114 generates the parity data for each of the certain data amount to be transferred to the nonvolatile memory 115, stores the data in the nonvolatile memory 115, and also stores the parity data in the nonvolatile memory 115.

The FPGA 114 continuously writes the data by the certain amount in the nonvolatile memory 115 on the basis of the instruction from the CPU 112. Then, even when an error is generated during a process in which the FPGA 114 writes the data in the nonvolatile memory 115, in a case where the FPGA 114 can restore the error data by the parity data, the FPGA 114 does not write back the data again from the first data started to be written on the basis of the instruction from the CPU 112. The FPGA 114 writes the remaining data on which the instruction is issued from the CPU 112 in the nonvolatile memory 115 subsequently also after the error detection.

In a case where the FPGA 114 determines that the error generated in the processing of writing the data in the nonvolatile memory 115 cannot be restored by using the parity data, the FPGA 114 rewrites the data again from the beginning in another region of the nonvolatile memory 115 ("the replacement area 1002" described in FIG. 10 according to the embodiment).

According to this, the disk array apparatus 100 can reduce the data rewrite caused by the error in course of the data write without decreasing the data amount continuously written by the FPGA 114 in the nonvolatile memory 115 on the basis of the instruction from the CPU 112. Furthermore, the disk array apparatus 100 can also reduce the time for deleting (erasing) the data whose write succeeds before the error generation. The disk array apparatus 100 can save the data held in the volatile memory 113 of the disk controller 105 into the nonvolatile memory 115 at a higher speed.

Furthermore, the FPGA 114 according to the embodiment multiplexes the invalidity management table 218 to be written in the "Block 0" of the nonvolatile memory 115. Then, the FPGA 114 stores the invalidity management tables 218 in a plurality of generations in the nonvolatile memory 115 for management. Then, when the FPGA 114 saves the data in the volatile memory 113 into the nonvolatile memory 115, the FPGA 114 (to be more specific, the transfer control unit 208) reads the invalidity management table 218 from the nonvolatile memory 115. The transfer control unit 208 checks the CRC data 903 of the read invalidity management table 218 to determine whether or not the invalidity management table 218 is damaged. In a case where the transfer control unit 218 determines that the invalidity management table 218 is damaged, the other multiplexed invalidity management tables 218 are read, the CRC data thereof is checked. In a case where the transfer control unit 202 checks the CRC data of all the multiplexed invalidity management tables 218 and determines that all of those invalidity management tables 218 are damaged, the invalidity management table in the previous generation is read. The transfer control unit 218 checks the CRC data of the invalidity management table in the previous generation and determines whether or not the invalidity management table in the previous generation is damaged. After that, the transfer control unit 208 keeps checking the invalidity management tables until it is determined that the undamaged invalidity management table exists by checking the CRC data and reads the undamaged invalidity management table.

According to this, the FPGA 114 can certainly read the invalidity management table from the nonvolatile memory 115, and therefore the data held in the volatile memory 113 can be certainly saved into the nonvolatile memory 115.

[2.6. DE Ports 116 and 122]

The DE port 116 is connected to the disks 107 to 110. Similarly, the DE port 122 is also connected to the disks 107 to 110.

The DE port 116 is a port for expanding DE (drive enclosure). According to the embodiment, the DE port 116 enables a multi-stage connection of maximum nice DEs based on a cascade connection. To one DE, for example, six disks can be connected. For that reason, the DE port 116 enables a connection of maximum 120 disks via the DEs. According to the embodiment, as a representative, the disks 107 to 110 connected to the DE port 116 are described.

[2.7. Recovery of Disk Array Apparatus 100]

When the disk array apparatus 100 is recovered from the power failure, the FPGA 114 writes back the data saved into the nonvolatile memory 115 to the volatile memory 113. To be more specific, the data recovery unit 204 writes back the data saved into the nonvolatile memory 115 to the volatile memory 113. The CPU 112 instructs the data recovery unit 204 to write back the data saved into the nonvolatile memory 115 to the volatile memory 113. The data recovery unit 204 transfers the data held by the nonvolatile memory 115 to the communication unit 201 via the buffer 217. Then, the communication unit 201 transfers the data via the CPU 112 to the volatile memory 113.

After the data recovery unit 204 completes the transfer of the data from the nonvolatile memory 115 to the volatile memory 113, the table management unit 206 resets the Dirty flag 901 of the invalidity management table 218 (all the flags constructing the Dirty flag 901 are retuned to "0"). Similarly, the table management unit 207 resets the Dirty flag of the invalidity management table 219. According to this, the disk array apparatus 100 according to the embodiment can effectively use the resource (capacity) of the nonvolatile memory 115. The area where the Dirty flag is "1" is the area where the data transfer units 202 and 203 erroneously perform the data write because of a state other than the damage of the hardware of the nonvolatile memory 115 itself. That is, the area where the Dirty flag is "1" is the area where the data transfer units 202 and 203 can perform the write if the data write is tried again. For that reason, as the table management units 206 and 207 reset the Dirty flag as "1" in the stage where the power failure is recovered, in a case where power failure is generated again, the data transfer units 202 and 203 can write (save) the data also in the area where the Dirty flag is "1".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

The invention claimed is:

1. A controlling apparatus for controlling a disk array unit comprising:
    a cache memory for caching data of the disk array unit;
    a nonvolatile memory for storing the data in the cache memory; and
    a control unit
        for detecting a defective location in the nonvolatile memory where the data is stored defectively and updating information indicating the defection location,
        for generating an error detection code of the generated information,
        for writing the updated information and the associated error detection code into an area of the nonvolatile memory different from any area where any information indicating any defective location previously detected and stored into the nonvolatile memory, and
        for controlling writing the data in the cache memory into a location of the nonvolatile memory designated by any selected one of the information stored in the nonvolatile memory.

2. The controlling apparatus according to claim 1, further comprising a managing memory for storing the selected one of the information; and
    wherein the controller writes any selected one of the information in the nonvolatile memory into the management memory, and
    wherein the controller controls writing of data into a location of the cache memory designated by using the information in the management memory.

3. The controlling apparatus according to claim 2, wherein when detecting the defective location in the nonvolatile memory where the data is stored defectively, the controller updates the information in the managing memory.

4. The controlling apparatus according to claim 3, wherein the controller writes the updated information and the associated error detection code into an area of the nonvolatile memory different after writing of data into a location of the cache memory.

5. The controlling apparatus according to claim 1, wherein when cutting electric power to the controlling apparatus, the controller controls writing the data in the cache memory into a location of the nonvolatile memory.

6. The controlling apparatus according to claim 5, further comprising a capacitor for supplying electric power to the controlling apparatus when cutting electric power to the disk array unit.

7. The controlling apparatus according to claim 2, wherein when restarting the power supply to the controlling apparatus, the controller controls writing the data in the nonvolatile memory into a cache memory and writes any selected one of the information in the nonvolatile memory into the management memory.

8. The controlling apparatus according to claim 1, wherein the writing the updated information and the associated error detection code into an area of the nonvolatile memory is a multiple-writing.

9. A controlling method for controlling a disk array unit by a controlling apparatus, the controlling method comprising:
    detecting a defective location in a nonvolatile memory where the data is stored defectively and updating information indicating the defection location,
    generating an error detection code of the updated information,
    writing the generated information and the associated error detection code into an area of the nonvolatile memory different from any area where any information indicating any defective location previously detected and stored into the nonvolatile memory, and controlling writing the data in a cache memory into a location of the nonvolatile memory designated by any selected one of the information stored in the nonvolatile memory.

10. The controlling method according to claim 9, further comprising writing any selected one of the information in the nonvolatile memory into the management memory, and wherein the controlling controls of data into a location of the cache memory designated by using the information in the management memory.

11. The controlling method according to claim 10, wherein when detecting the defective location in the nonvolatile memory where the data is stored defectively, the updating updates the information in the managing memory.

12. The controlling method according to claim 11, wherein the writing writes the updated information and the associated error detection code into an area of the nonvolatile memory different after controlling writing of data into a location of the cache memory.

13. The controlling method according to claim 9, wherein the controlling controls writing the data in the cache memory into a location of the nonvolatile memory when cutting electric power to the controlling apparatus.

14. The controlling method according to claim 9, wherein the writing the updated information and the associated error detection code into an area of the nonvolatile memory is a multiple-writing.

15. A computer-readable recording medium storing a computer program making a backup of cache data of a disk array apparatus to a nonvolatile memory, the program being designed to make a computer perform the steps of:

detecting a defective location in a nonvolatile memory where the data is stored defectively and updating information indicating the defection location, generating an error detection code of the generated information, writing the generated information and the associated error detection code into an area of the nonvolatile memory different from any area where any information indicating any defective location previously detected and stored into the nonvolatile memory, and controlling writing the data in a cache memory into a location of the nonvolatile memory designated by any selected one of the information stored in the nonvolatile memory.

* * * * *

UNITED STATES PATENT AND TRADEMARK OFFICE
CERTIFICATE OF CORRECTION

PATENT NO. : 8,074,104 B2
APPLICATION NO. : 12/849354
DATED : December 6, 2011
INVENTOR(S) : Tomoharu Muro et al.

It is certified that error appears in the above-identified patent and that said Letters Patent is hereby corrected as shown below:

Column 1, Line 7, Delete "PCT/W/2008/52145," and insert -- PCT/JP/2008/52145, --, therefor.

Signed and Sealed this
Twenty-seventh Day of March, 2012

David J. Kappos
*Director of the United States Patent and Trademark Office*